US011350269B2

(12) United States Patent
Manolakos et al.

(10) Patent No.: US 11,350,269 B2
(45) Date of Patent: May 31, 2022

(54) ANTENNA CORRELATION FEEDBACK FOR PARTIAL RECIPROCITY

(71) Applicant: QUALCOMM Incorporated, San Diego, CA (US)

(72) Inventors: Alexandros Manolakos, Escondido, CA (US); Weimin Duan, San Diego, CA (US); Muhammad Sayed Khairy Abdelghaffar, San Jose, CA (US); Pavan Kumar Vitthaladevuni, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/021,704

(22) Filed: Sep. 15, 2020

(65) Prior Publication Data
US 2021/0136566 A1 May 6, 2021

(30) Foreign Application Priority Data
Oct. 31, 2019 (GR) .............................. 20190100488

(51) Int. Cl.
*H04W 8/24* (2009.01)
*H04W 76/10* (2018.01)

(52) U.S. Cl.
CPC ............. *H04W 8/24* (2013.01); *H04W 76/10* (2018.02)

(58) Field of Classification Search
CPC ................................ H04W 8/24; H04W 76/10
USPC ........................................................ 370/310
See application file for complete search history.

(56) References Cited

U.S. PATENT DOCUMENTS

| 9,673,883 | B2 | 6/2017 | Zhao et al. | |
| 2013/0257680 | A1 | 10/2013 | Nix et al. | |
| 2014/0307815 | A1* | 10/2014 | Alex | H04L 25/0202 375/267 |
| 2016/0080052 | A1* | 3/2016 | Li | H04B 7/0632 375/267 |

(Continued)

FOREIGN PATENT DOCUMENTS

EP 2496008 A1 9/2012

OTHER PUBLICATIONS

International Search Report and Written Opinion—PCT/US2020/050966—ISA/EPO—dated Nov. 30, 2020.

*Primary Examiner* — Congvan Tran
(74) *Attorney, Agent, or Firm* — Holland & Hart LLP

(57) ABSTRACT

Methods, systems, and devices for wireless communications are described. The described techniques provide for the establishment of a communication link between a base station and a user equipment (UE). The UE may have a spatial partial reciprocity capability. The UE may be configured to determine antenna cross-correlation information for at least a first subset of antenna elements in the UE. The cross-correlation information may include one or more correlation parameters (e.g., correlation coefficients), a correlation model, or both. The UE may transmit sounding reference signals for a second set of antenna elements in accordance with the spatial partial reciprocity capability. The UE may also transmit an indication of the cross-correlation information for at least the first subset of antenna elements of the UE. The base station may use such information to derive correlation parameters for the unsounded antennas and determine precoders for downlink communications.

26 Claims, 15 Drawing Sheets

(56) References Cited

U.S. PATENT DOCUMENTS

| | | | |
|---|---|---|---|
| 2018/0183502 A1* | 6/2018 | Sandberg | H04L 27/2675 |
| 2018/0206132 A1* | 7/2018 | Guo | H04W 72/0473 |
| 2019/0068260 A1* | 2/2019 | Yan | H04L 5/0048 |
| 2019/0090273 A1* | 3/2019 | Yoo | H01Q 1/246 |
| 2019/0109625 A1 | 4/2019 | Subramanian et al. | |
| 2020/0037360 A1* | 1/2020 | Qian | H04W 52/367 |

\* cited by examiner

ANTENNA CORRELATION FEEDBACK FOR PARTIAL RECIPROCITY

CROSS REFERENCE

The present Application for Patent claims the benefit of Greece Provisional Patent Application No. 20190100488 by MANOLAKOS et al., entitled "ANTENNA CORRELATION FEEDBACK FOR PARTIAL RECIPROCITY," filed Oct. 31, 2019, assigned to the assignee hereof, and expressly incorporated by reference in its entirety herein.

FIELD OF TECHNOLOGY

The following relates generally to wireless communications and more specifically to antenna correlation feedback for partial reciprocity situations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support antenna correlation feedback for partial reciprocity situations. In some examples, user equipments (UEs) may transmit sounding reference signals to a base station. The base station may use the received sounding reference signals to estimate channel characteristics. For example, the base station may estimate channel characteristics for downlink communication based on the sounding reference signals received from the UE. In some examples, however, a UE may not have the capability to or may not be configured to sound every antenna or port. As a result, the base station may have a limited amount of information to use to estimate downlink channel characteristics. Generally, the described techniques provide for the establishment of a communication link between a base station and a UE that may have a spatial partial reciprocity capability. The UE may be configured to determine antenna cross-correlation information for at least a first subset of antenna elements in the UE. The cross-correlation information may include one or more correlation parameters (e.g., correlation coefficients), a correlation model, or both, among other examples. The UE may transmit sounding reference signals for a second set of antenna elements, that may be different than the first subset of antenna elements, in accordance with the spatial partial reciprocity capability. The UE may transmit an indication of the cross-correlation information for at least the first subset of antenna elements of the UE. The base station may use such information to derive correlation parameters for at least some of the unsounded antennas and may determine precoders for downlink communications, among other examples. As such, using the determined precoders using the cross-correlation information, the base station may be able to estimate channel characteristics for the downlink communications.

A method of wireless communications at a UE is described. The method may include establishing a communication link with a base station, where the UE is configured to transmit sounding reference signals for the communication link, transmitting, to the base station, an indication of a partial reciprocity capability of the UE based at least in part on establishing the communication link, determining antenna cross-correlation information for a first subset of antenna elements of the UE, and transmitting, to the base station, a sounding reference signal for a second subset of the antenna elements of the UE in accordance with the spatial partial reciprocity capability and an indication of the antenna cross-correlation information for the first subset of antenna elements of the UE.

An apparatus for wireless communications at a UE is described. The apparatus may include a processor, memory coupled with the processor, and instructions stored in the memory. The instructions may be executable by the processor to cause the apparatus to establish a communication link with a base station, where the UE is configured to transmit sounding reference signals for the communication link, transmit, to the base station, an indication of a partial reciprocity capability of the UE based at least in part on establishing the communication link, determine antenna cross-correlation information for a first subset of antenna elements of the UE, and transmit, to the base station, a sounding reference signal for a second subset of the antenna elements of the UE in accordance with the spatial partial reciprocity capability and an indication of the antenna cross-correlation information for the first subset of antenna elements of the UE.

Another apparatus for wireless communications at a UE is described. The apparatus may include means for establishing a communication link with a base station, where the UE is configured to transmit sounding reference signals for the communication link, transmitting, to the base station, an indication of a partial reciprocity capability of the UE based at least in part on establishing the communication link, determining antenna cross-correlation information for a first subset of antenna elements of the UE, and transmitting, to the base station, a sounding reference signal for a second subset of the antenna elements of the UE in accordance with the spatial partial reciprocity capability and an indication of the antenna cross-correlation information for the first subset of antenna elements of the UE.

A non-transitory computer-readable medium storing code for wireless communications at a UE is described. The code may include instructions executable by a processor to establish a communication link with a base station, where the UE is configured to transmit sounding reference signals for the communication link, transmit, to the base station, an indication of a partial reciprocity capability of the UE based at least in part on establishing the communication link, determine antenna cross-correlation information for a first subset of antenna elements of the UE, and transmit, to the base station, a sounding reference signal for a second subset of the antenna elements of the UE in accordance with the spatial partial reciprocity capability and an indication of the antenna cross-correlation information for the first subset of antenna elements of the UE.

In some examples of the method, apparatuses, and non-transitory computer-readable medium described herein, transmitting the indication of the antenna cross-correlation information may include operations, features, means, or instructions for transmitting one or more correlation parameters, an indication of an antenna correlation model, or both.

Some examples of the method, apparatuses, and non-transitory computer-readable medium described herein may further include operations, features, means, or instructions for determining an average cross-correlation of at least some of the first subset of antenna elements in accordance with the antenna correlation model, where transmitting the one or more correlation parameters includes transmitting the average cross-correlation of the first subset of antenna elements.

In some examples of the method, apparatuses, and non-transitory computer-readable medium described herein, transmitting the one or more correlation parameters may include operations, features, means, or instructions for transmitting the one or more correlation parameters including a distance between two antenna elements, a reference correlation value, a scaling factor indicating correlation values for at least some of the first subset of antenna elements relative to a correlation value of one or more of the second subset of antenna elements, or any combination thereof.

Some examples of the method, apparatuses, and non-transitory computer-readable medium described herein may further include operations, features, means, or instructions for determining at least one cross-correlation value corresponding to at least one cross-correlation of at least two antenna elements of the first subset of antenna elements in accordance with the antenna correlation model, where transmitting the one or more correlation parameters includes transmitting the at least one cross-correlation value.

In some examples of the method, apparatuses, and non-transitory computer-readable medium described herein, transmitting the transmitting the one or more correlation parameters or the indication of an antenna correlation model may include operations, features, means, or instructions for transmitting the one or more correlation parameters or the indication of the antenna correlation model on a per band or per band per band combination basis.

In some examples of the method, apparatuses, and non-transitory computer-readable medium described herein, transmitting the antenna cross-correlation information further may include operations, features, means, or instructions for transmitting channel state information to the base station, where the channel state information includes an indication of an antenna correlation value of unsounded sounding reference signal ports including the second subset of antenna elements, an indication of the antenna correlation model, or both.

Some examples of the method, apparatuses, and non-transitory computer-readable medium described herein may further include operations, features, means, or instructions for receiving, from the base station, a request for the channel state information, where the channel state information may be transmitted based on the received request.

In some examples of the method, apparatuses, and non-transitory computer-readable medium described herein, the request for the channel state information may be received using radio resource control signaling, medium access control element signaling, or both.

In some examples of the method, apparatuses, and non-transitory computer-readable medium described herein, the channel state information may be transmitted to the base station on a semi-static basis or a dynamic basis.

In some examples of the method, apparatuses, and non-transitory computer-readable medium described herein, transmitting the channel state information may include operations, features, means, or instructions for transmitting the channel state information on a physical uplink control channel or a physical uplink shared channel.

In some examples of the method, apparatuses, and non-transitory computer-readable medium described herein further include operations, features, means, or instructions for determining to transmit the channel state information on the physical uplink control channel or the physical uplink shared channel based at least in part on a size of the channel state information.

In some examples of the method, apparatuses, and non-transitory computer-readable medium described herein, each unsounded sounding reference signal port corresponds to a physical antenna of the UE.

In some examples of the method, apparatuses, and non-transitory computer-readable medium described herein, transmitting the one or more correlation parameters may include operations, features, means, or instructions for transmitting the one or more correlation parameters corresponding to a spatial correlation matrix, an antenna imbalance, or both.

In some examples of the method, apparatuses, and non-transitory computer-readable medium described herein, the antenna correlation model may be based on an antenna spatial separation between at least two antennas of the antenna elements and a reference correlation value indicating an envelope correlation between two cross-polarized antenna elements.

In some examples of the method, apparatuses, and non-transitory computer-readable medium described herein, the antenna correlation model may be based on an antenna spatial separation between at least two antennas of the antenna elements, a reference correlation value indicating an envelope correlation between two cross-polarized antenna elements, and a number of antennas.

In some examples of the method, apparatuses, and non-transitory computer-readable medium described herein, the antenna correlation model may be based on a first reference correlation value of cross-polarized antenna elements in a first dimension, a second reference correlation value of cross-polarized antenna elements in a second dimension, a correlation value of cross-polarized antenna elements having different polarizations, or a combination thereof.

In some examples of the method, apparatuses, and non-transitory computer-readable medium described herein, the first subset of antenna elements includes at least each antenna element of the second subset antenna elements.

In some examples of the method, apparatuses, and non-transitory computer-readable medium described herein, the first subset of antenna elements may be different from the second subset of antenna elements.

Some examples of the method, apparatuses, and non-transitory computer-readable medium described herein may further include operations, features, means, or instructions for transmitting, to the base station, a capability indicator specifying a first number of sounding reference signal ports that the UE may be capable of sounding during a sounding period, and receiving, from the base station, a request to sound a second number of sounding reference signal ports different than the first number of sounding reference signal ports during the sounding period in accordance with the spatial partial reciprocity capability, where the sounding reference signal for the second subset of antenna elements may be transmitted in accordance with the request.

Some examples of the method, apparatuses, and non-transitory computer-readable medium described herein may further include operations, features, means, or instructions for receiving, from the base station, a downlink communication having a precoding determined in accordance with the sounding reference signal and the antenna cross-correlation information.

In some examples of the method, apparatuses, and non-transitory computer-readable medium described herein, the sounding reference signal and the antenna cross-correlation information indicate a precoder value for receiving downlink communications on each receive antenna of the UE.

In some examples of the method, apparatuses, and non-transitory computer-readable medium described herein, the antenna cross-correlation information indicates an envelope correlation between cross-polarized antenna elements.

In some examples of the method, apparatuses, and non-transitory computer-readable medium described herein, the antenna elements include physical antennas, sounding reference signal ports, or both.

A method of wireless communications at a base station is described. The method may include establishing a communication link with a UE, the communication link for receiving sounding reference signals, receiving, from the UE and based at least in part on establishing the communication link, an indication of a partial reciprocity capability of the UE, receiving one or more sounding reference signal for a second subset of antenna elements of the UE in accordance with the spatial partial reciprocity capability and an indication of antenna cross-correlation information corresponding to a first subset of antenna elements at the UE, and determining a precoder value for at least the first subset of antenna elements based on the received sounding reference signal for the second subset of antenna elements and the indication of the antenna cross-correlation information.

An apparatus for wireless communications at a base station is described. The apparatus may include a processor, memory coupled with the processor, and instructions stored in the memory. The instructions may be executable by the processor to cause the apparatus to establish a communication link with a UE, the communication link for receiving sounding reference signals, receive, from the UE and based at least in part on establishing the communication link, an indication of a partial reciprocity capability of the UE, receive one or more sounding reference signal for a second subset of antenna elements of the UE in accordance with the spatial partial reciprocity capability and an indication of antenna cross-correlation information corresponding to a first subset of antenna elements at the UE, and determine a precoder value for at least the first subset of antenna elements based on the received sounding reference signal for the second subset of antenna elements and the indication of the antenna cross-correlation information.

Another apparatus for wireless communications at a base station is described. The apparatus may include means for establishing a communication link with a UE, the communication link for receiving sounding reference signals, receiving, from the UE and based at least in part on establishing the communication link, an indication of a partial reciprocity capability of the UE, receiving one or more sounding reference signal for a second subset of antenna elements of the UE in accordance with the spatial partial reciprocity capability and an indication of antenna cross-correlation information corresponding to a first subset of antenna elements at the UE, and determining a precoder value for at least the first subset of antenna elements based on the received sounding reference signal for the second subset of antenna elements and the indication of the antenna cross-correlation information.

A non-transitory computer-readable medium storing code for wireless communications at a base station is described. The code may include instructions executable by a processor to establish a communication link with a UE, the communication link for receiving sounding reference signals, receive, from the UE and based at least in part on establishing the communication link, an indication of a partial reciprocity capability of the UE, receive one or more sounding reference signal for a second subset of antenna elements of the UE in accordance with the spatial partial reciprocity capability and an indication of antenna cross-correlation information corresponding to a first subset of antenna elements at the UE, and determine a precoder value for at least the first subset of antenna elements based on the received sounding reference signal for the second subset of antenna elements and the indication of the antenna cross-correlation information.

In some examples of the method, apparatuses, and non-transitory computer-readable medium described herein, receiving the indication of the antenna cross-correlation information may include operations, features, means, or instructions for receiving one or more correlation parameters, an indication of an antenna correlation model, or both.

In some examples of the method, apparatuses, and non-transitory computer-readable medium described herein, receiving the one or more correlation parameters may include operations, features, means, or instructions for receiving the one or more correlation parameters including an average cross-correlation of the first subset of antenna elements, where the precoder value for the first subset of antenna elements may be determined based on the average cross-correlation.

In some examples of the method, apparatuses, and non-transitory computer-readable medium described herein, receiving the one or more correlation parameters may include operations, features, means, or instructions for receiving a distance between two antenna elements, a reference correlation value, a scaling factor indicating correlation values for at least some of the first subset of antenna elements relative to a correlation value of one or more of the second subset of antenna elements, or any combination thereof.

In some examples of the method, apparatuses, and non-transitory computer-readable medium described herein, receiving the one or more correlation parameters may include operations, features, means, or instructions for estimating a second cross-correlation value corresponding to a second cross-correlation of a second pair of antenna elements of the first subset of antenna elements based on the at least one first cross-correlation value and the antenna correlation model.

Some examples of the method, apparatuses, and non-transitory computer-readable medium described herein may further include operations, features, means, or instructions for estimating a reference correlation based on the at least one first cross-correlation value, where the second cross-correlation value may be determined based on the estimated reference correlation.

In some examples of the method, apparatuses, and non-transitory computer-readable medium described herein, the one or more correlation parameters, the indication of the antenna correlation model, or both correspond to a band or a band of a band combination.

Some examples of the method, apparatuses, and non-transitory computer-readable medium described herein may further include operations, features, means, or instructions for receiving channel state information from the UE, where the channel state information includes an indication of an antenna correlation value of unsounded sounding reference signal ports including the second subset of antenna elements, an indication of the antenna correlation model, or both.

Some examples of the method, apparatuses, and non-transitory computer-readable medium described herein may further include operations, features, means, or instructions for transmitting, to the UE, a request for the channel state information, where the channel state information may be received based on the transmitted request.

In some examples of the method, apparatuses, and non-transitory computer-readable medium described herein, the request for the channel state information may be transmitted using radio resource control signaling, medium access control element signaling, or both.

In some examples of the method, apparatuses, and non-transitory computer-readable medium described herein, the channel state information may be received from the UE on a semi-static basis or a dynamic basis.

In some examples of the method, apparatuses, and non-transitory computer-readable medium described herein, the channel state information may be received on a physical uplink control channel or a physical uplink shared channel.

In some examples of the method, apparatuses, and non-transitory computer-readable medium described herein, receiving the one or more correlation parameters may include operations, features, means, or instructions for receiving the one or more correlation parameters corresponding to a spatial correlation matrix, an antenna imbalance, or both.

In some examples of the method, apparatuses, and non-transitory computer-readable medium described herein, the antenna correlation model may be based on an antenna spatial separation between at least two antennas of the antenna elements and a reference correlation value indicating an envelope correlation between two cross-polarized antenna elements.

In some examples of the method, apparatuses, and non-transitory computer-readable medium described herein, the antenna correlation model may be based on an antenna spatial separation between at least two antennas of the antenna elements, a reference correlation value indicating an envelope correlation between two cross-polarized antenna elements, and a number of antennas.

In some examples of the method, apparatuses, and non-transitory computer-readable medium described herein, the antenna correlation model may be based on a first reference correlation value of cross-polarized antenna elements in a first dimension, a second reference correlation value of cross-polarized antenna elements in a second dimension, a correlation value of cross-polarized antenna elements having different polarizations, or a combination thereof.

In some examples of the method, apparatuses, and non-transitory computer-readable medium described herein, the first subset of antenna elements includes each antenna element of the second subset of antenna element.

In some examples of the method, apparatuses, and non-transitory computer-readable medium described herein, the first subset of antenna elements may be different from the second subset of antenna elements.

Some examples of the method, apparatuses, and non-transitory computer-readable medium described herein may further include operations, features, means, or instructions for receiving, from the UE, a capability indicator specifying a first number of sounding reference signal ports that the UE may be capable of sounding during a sounding period, and transmitting, to the UE, a request to sound a second number of sounding reference signal ports different than the first number of sounding reference signal ports during the sounding period in accordance with the spatial partial reciprocity capability, where the sounding reference signal for the second subset of antenna elements may be received in accordance with the request.

Some examples of the method, apparatuses, and non-transitory computer-readable medium described herein may further include operations, features, means, or instructions for transmitting, to the UE, a downlink communication having a precoding determined in accordance with the sounding reference signal and the antenna cross-correlation information.

Some examples of the method, apparatuses, and non-transitory computer-readable medium described herein may further include operations, features, means, or instructions for determining the precoder value for the second subset of antenna elements of the UE based on the sounding reference signal and the antenna cross-correlation information.

In some examples of the method, apparatuses, and non-transitory computer-readable medium described herein, the antenna cross-correlation information indicates an envelope correlation between cross-polarized antenna elements.

In some examples of the method, apparatuses, and non-transitory computer-readable medium described herein, the antenna elements include physical antennas, sounding reference signal ports, or both.

DETAILED DESCRIPTION

Figure 1:
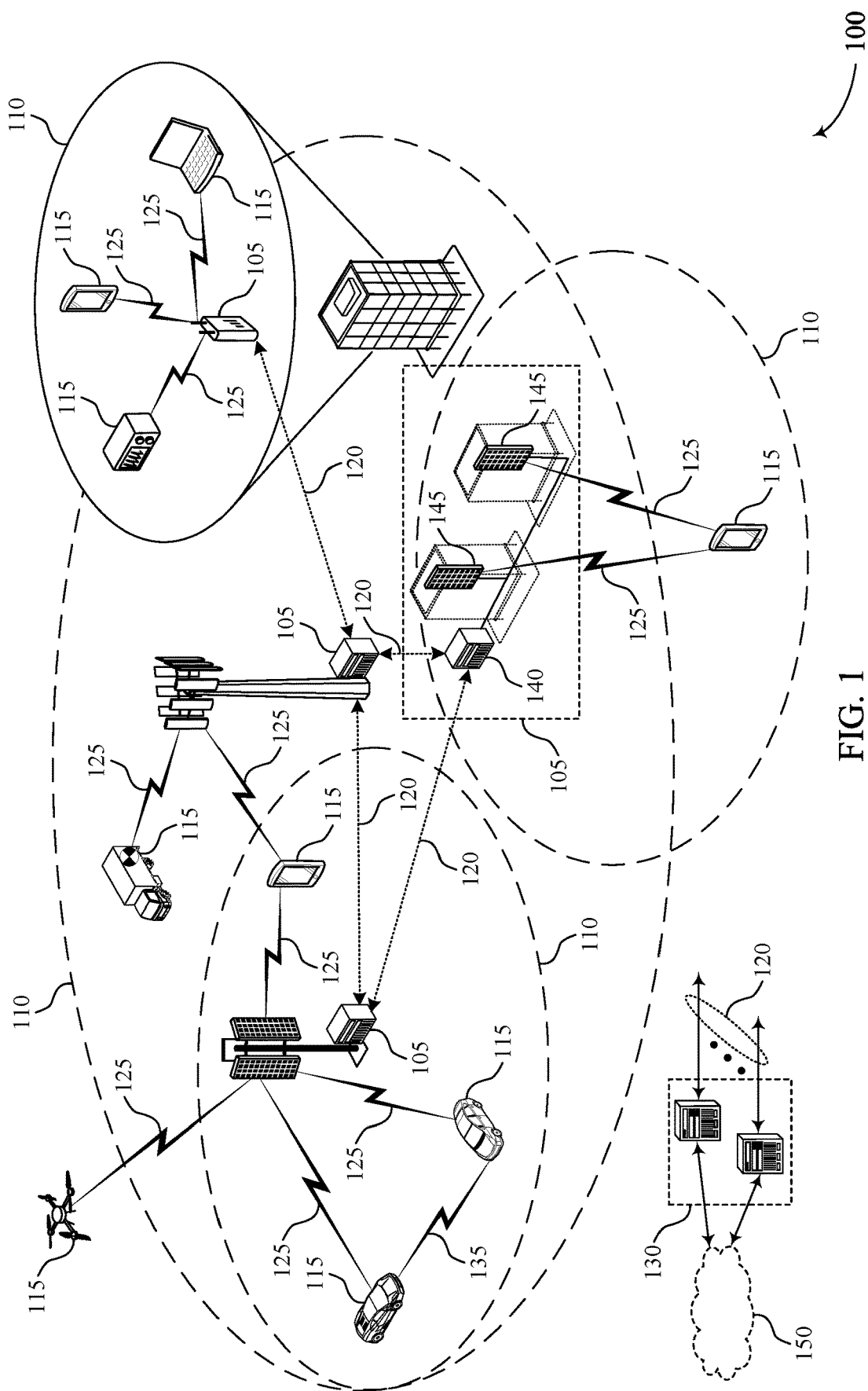
FIG. 1 illustrates an example of a system for wireless communications that supports antenna correlation feedback for partial reciprocity situations in accordance with aspects of the present disclosure.

In some wireless communication environments, a user equipment (UE) may transmit one or more sounding reference signals for one or more antenna elements (e.g., physical antennas and/or ports). A base station may determine various characteristics for a downlink communication link based on the received sounding reference signals. In some examples, a UE may not have the capability or may not be configured to sound one or more antennas or ports. In some examples, the UE may sound less than all of the antennas or ports based on information or an instruction received from a base station. In such examples, the UE may not provide sounding reference signal (SRS) information related to each antenna/port, and the base station may not be able to adequately estimate the downlink channel characteristics because the base station does not have the information regarding correlations between and performance of various UE antenna elements (e.g., antennas, ports).

The techniques described herein provide for a UE, functioning in accordance with a spatial partial reciprocity capability of the UE, determining antenna cross-correlation information (e.g., correlation information) for one or more antenna elements that are different than one or more antenna elements that transmit SRSs, and transmitting the correlation information to the base station. The base station may be able to use the received correlation information, based on or in conjunction with the received SRSs, to determine one or more channel characteristics, among other aspects, for a downlink channel. The channel characteristics may include precoder information for a downlink communication on the downlink channel. In some examples, the correlation information may include one or more correlation parameter values (e.g., an alpha value representing a reference correlation, a distance between antennas, an average correlation, etc.) or an indication of one or more correlation parameter values, an indication of a correlation model, or any combination thereof. In some examples, the base station may use the received information to derive the correlations associated with antenna elements that are not sounded. Accordingly, using these techniques, the base station may determine various characteristics for downlink communication with the UE using a subset of sounded antenna elements and correlation information for some or all of the other antenna elements.

Particular aspects of the subject matter described herein may be implemented to realize one or more advantages. The described techniques may support improvements in the sounding reference signal and downlink configuration framework, decreasing signaling overhead, and improving reliability, among other advantages. As such, supported techniques may include improved network operations and, in some examples, may promote network efficiencies, among other benefits. Aspects of the disclosure are initially described in the context of wireless communications systems. Aspects of the disclosure are further illustrated with respect to a wireless communications system and a process flow diagram. Aspects of the disclosure are further illustrated by and described with reference to apparatus diagrams, system diagrams, and flowcharts that relate to antenna correlation feedback for partial reciprocity situations.

FIG. 1 illustrates an example of a wireless communications system 100 that supports antenna correlation feedback for partial reciprocity situations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other examples, the device may provide HARQ feedback in a subsequent slot, or according to some other time interval.

UEs 115 may periodically or aperiodically transmit sounding reference signals (SRSs), and a base station 105 may use the received sounding reference signals to determine various characteristics for a downlink channel (e.g., a communication link 125) between the base station 105 and the UEs 115. In some examples, a UE 115 may not be capable of sounding each antenna element (e.g., physical antenna and/or SRS ports) at the same time. For example, certain UEs 115 may not have the capability to sound all four antennas on the uplink during a time period associated with the uplink communications. In reciprocity systems, downlink performance may depend on the quality of uplink estimation. As such, a UE 115 may operate in a spatial partial reciprocity configuration, in which the UE 115 may sound a subset of antenna elements (e.g., a subset of SRS resources). In such examples, the base station 105 may not receive sounding characteristics of the remaining antenna elements and may not be able to fully derive characteristics related to the downlink channel.

As described herein, a UE 115, operating according to a spatial partial reciprocity capability, may determine various antenna cross-correlation information for antenna elements that are different from the antenna elements that are sounded. The cross-correlation information may include various parameter values associated with cross-correlation of the unsounded antenna elements (e.g., coefficients), antenna correlation models use to calculate cross-correlations, etc. For example, the UE 115 may transmit an average cross-correlation of unsounded antenna elements, and the base station 105 may derive downlink signal characteristics (e.g., precoder values) for communication with the UE 115 based on the average cross-correlation and the received SRSs transmitted for the other antenna elements. The UE 115 may transmit other antenna cross-correlation information such as an indication of an antenna correlation model. As such, the base station 105 may have an indication of device characteristics of the UE 115 (e.g., a distance between antenna elements), and the base station 105 may be able to derive correlation information according to the device characteristics and the indicated model. Other information that may be transmitted by the UE 115 and used by the base station 105 may include antenna correlation values for some of the unsounded antenna elements (as well as sounded elements), antenna correlation values of unsounded ports/antennas, etc.

In some examples, the UE 115 may transmit antenna cross-correlation information in a physical uplink channel (e.g., physical uplink shared channel (PUSCH) or physical uplink control channel (PUCCH)). For example, the UE 115 may transmit channel state information (CSI) including an indication of the antenna cross-correlation information. The CSI may be transmitted on a semi-static or dynamic basis and may be transmitted in response to a request from a base station 105. For example, the CSI report may be transmitted semi-statically using RRC signaling or dynamically via MAC-CE messaging or UCI. In some examples, the information is indicated on a per band or per band per band combination basis. As such, the base station 105 may be able to determine downlink channel characteristics (e.g., precoder values) on a per band or per band per band combination basis.

Figure 2:
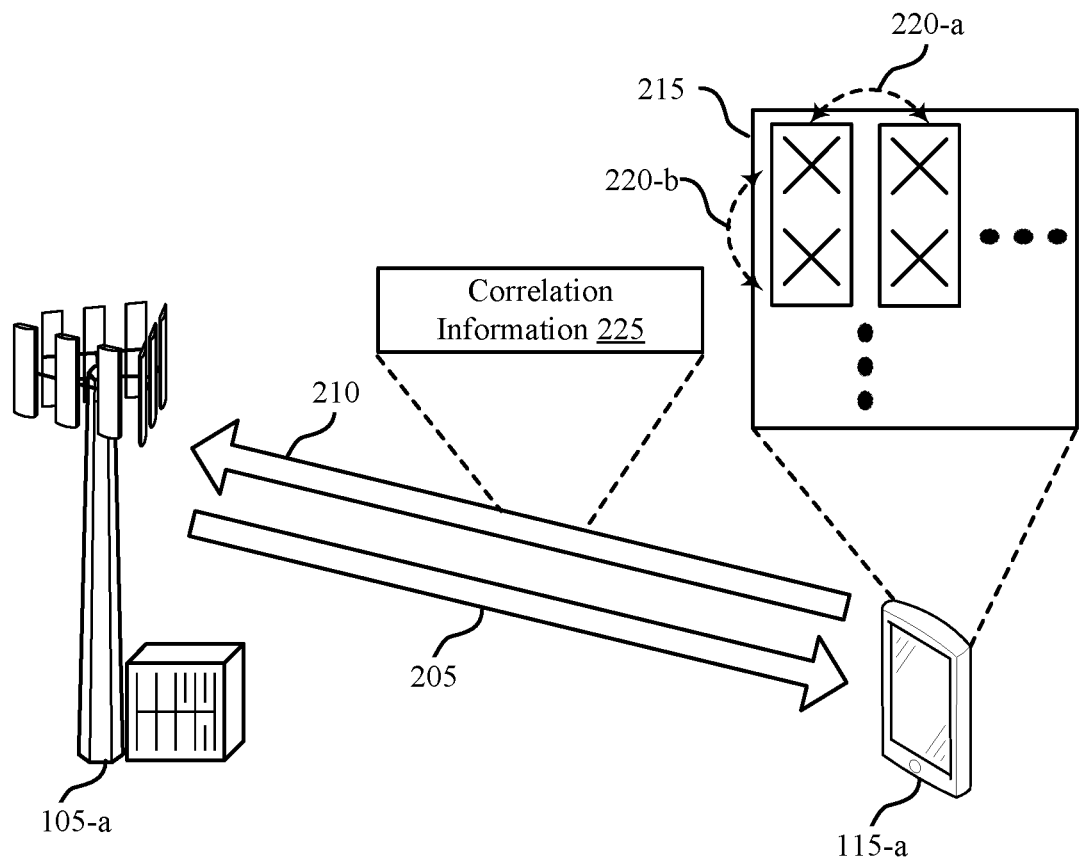
FIG. 2 illustrates an example of a wireless communications system that supports antenna correlation feedback for partial reciprocity situations in accordance with aspects of the present disclosure.

FIG. 2 illustrates an example of a wireless communications system 200 that supports antenna correlation feedback for partial reciprocity situations in accordance with aspects of the present disclosure. In some examples, wireless communications system 200 may implement aspects of wireless communication system 100. The wireless communications system 200 includes base station 105-*a* and UE 115-*a*, which may be examples of the corresponding devices of FIG. 1. The UE 115-*a* and the base station 105-*a* may establish a communication link, which may include one or more uplink channels 210 and one or more downlink channels 205.

The UE 115-*a* may be configured to sound (e.g., transmit one or more SRSs for) various antenna elements 215. The antenna elements may include physical antennas, which may be examples of transmit (Tx) or receive (Rx) antennas. Additionally or alternatively, the antenna elements may also include various ports, such as SRS ports allocated for SRS resources. The base station 105-*a* may utilize received SRS to determine various characteristics of the downlink channel 205. For example, the base station 105-*a* may determine various precoding values for downlink communications on the downlink channel 205. That is, the quality of performance of the downlink channel 205 may depend on the quality of the uplink estimation (e.g., based on the SRS transmitted by the UE 115-*a*).

Related to FIG. 2, the UE 115-*a* may be capable of sounding a subset of antenna elements 215 for the base station 105-*a* during a time period associated with SRS resources. In some examples, the UE 115-*a* reports the sounding capability to the base station 105-*a*. For example, the UE 115-*a* may transmit an indication of one or more values txry where the UE 115-*a* is able to sound x ports inside each SRS resource such that, in total, it sounds (accords multiple SRS resources) y ports. In such examples, the base station 105-a may configure the UE 115-a to sound a total y1<y SRS ports. Accordingly, the UE 115-a may operate according to a spatial partial reciprocity capability. Thus, the base station 105-a may not receive information (e.g., through SRS) about how each antenna element 215 of the UE 115-a may operate or how each antenna may be cross-correlated (e.g., how transmissions by various antennas may be coupled, as illustrated by lines 220). Thus, the base station 105-a may not be able to adequately identify characteristics for the downlink channel 205, such that various downlink communications are efficiently communicated or received by the UE 115-a.

As such, the UE 115-a may be configured to determine various antenna cross-correlation information 225 and transmit the antenna cross-correlation information 225 to the base station 105-a. The base station 105-a may utilize such information to determine cross-correlations for the antenna elements and determine characteristics for the downlink channel 205, such as precoder values to use in downlink communications. The UE 115-a may use various antenna correlation models to determine the antenna correlations. In one example, the UE 115-a determines antenna correlations based at least in part on a spatial correlation matrix for N antenna elements. For example, the UE 115-a may determine a spatial correlation for N antenna elements in one dimension as $R=[r_{ij}]_{i,j=1,\ldots,N}$, $r_{ij}=\alpha^{(d_{ij})^2}$, where $d_{ij}=|i-j|$ is the antenna spatial separation between antennas i and j, $\alpha$ is a reference correlation, which is the envelope correlation between the closest cross-polarized antenna elements. Another model may utilize the formula, $$r_{ij} = \alpha^{\left(\frac{d_{ij}}{N-1}\right)^2}$$

where N is the number antenna elements and is the envelope correlation between the farthest cross-polarized antenna elements. In some examples, the UE 115-a uses antenna reference correlation=0:0.1:0.6. In some examples, the UE 115-a antenna imbalance may be considered, such that the UE antenna imbalance may be [0, −3, x, x, x, x, x, x] dB, where x=−10:1:03 swept for simulations. There may be no imbalance assumed for the base station 105-a.

Another model may consider low correlation (RAN4), high correlation (RAN4) and mMIMO, which may utilize the parameters as show in Table 1:

TABLE 1

|  | α1 | α2 | β |
|---|---|---|---|
| Low Corr | 0 | 0 | 0 |
| High Corr | 0.9 | 0.9 | 0.9 |
| mMIMO | 0.9 | 0.9 | 0:0.1:0.6 | where α1 applies to cross-polarized antenna elements in a first dimension (e.g., horizontal) at the UE 115-a, α2 applies to cross-polarized antenna elements in a second dimension (e.g., vertical) at the UE 115-a, and β applies to cross-polarized antenna elements in a first direction or a second direction and between antennas having different polarizations. In some examples, other parameters may be considered. The "Low Con" scenario may correspond to the non-MMIMO deployment with uncorrelated gNB antennas (e.g., at the base station 105-a). In such examples, the antenna elements 215 may be placed in multiple panels, and the correlation between nearby antennas may be small. In the high correlation and the mMIMO scenarios, the antenna elements 215 may be placed in one panel, and the correlation between nearby antennas may be relatively high. In the mMIMO scenario, the UE 115-a may be able to "sweep" the correlation of antenna elements 215, because many antennas may be closely placed on one panel. The following Table 2 may illustrate antenna correlations for a 3.3-3.8 GHz band:

| Envelope Correlation Coefficient | | | | | | | | |
|---|---|---|---|---|---|---|---|---|
|  | Ant0 | Ant1 | Ant2 | Ant3 | Ant4 | Ant5 | Ant6 | Ant7 |
| Ant0 | — | | | | | | | |
| Ant1 | 0.00 | — | | | | | | |
| Ant2 | 0.22 | 0.00 | — | | | | | |
| Ant3 | 0.00 | 0.09 | 0.00 | — | | | | |
| Ant4 | 0.01 | 0.29 | 0.01 | 0.04 | — | | | |
| Ant5 | 0.04 | 0.00 | 0.07 | 0.01 | 0.01 | — | | |
| Ant6 | 0.00 | 0.01 | 0.00 | 0.01 | 0.05 | 0.03 | — | |
| Ant7 | 0.04 | 0.00 | 0.08 | 0.02 | 0.01 | 0.06 | 0.01 | — |

In some examples, the UE 115-a may report back one or more antenna correlation parameters and a model assumption. If the antenna correlation is $r_{ij}=\alpha^{(d_{ij})^2}$ and the antenna transmits SRS from a subset of antennas, then the UE 115-a may feedback the average cross-correlations of the remaining antennas. For example, if the UE 115-a has 4 Rx antennas and transmits from 2 Tx antennas (e.g., ant0 and ant1), then there may be $r_{01}$, $r_{02}$, $r_{03}$, $r_{12}$, $r_{13}$, $r_{23}$, coefficients. The $r_{01}$ may be estimated by the base station 105-a based on the two Tx antennas. However, the remaining five elements may not be estimated. In such examples, the UE 115-a may transmit an average correlation of the remaining antennas, a model used to estimate the correlation by the base station 105-a, a subset of the coefficients (e.g., the first two coefficients), etc. For example, if the UE 115-a transmits the first 2 coefficients/antenna correlations, then the receiver (e.g., base station 105-a), may estimate the parameters (e.g., $\alpha$), and then use a to derive the remaining correlations.

In some examples, the UE 115-a may report the antenna cross-correlation information 225 (e.g., correlation information), such as antenna correlation model, a set of antenna correlation parameters, etc. For example, the UE 115-a may indicate a correlation model via a lookup table or other technique. Similarly, the UE 115-a may indicate correlation parameters, correlation coefficients, antenna distances, etc. using a lookup table, message field, etc. In some examples, the UE 115-a may report the antenna correlation model or the antenna cross-correlation parameters on: (1) a per band per band combination basis, or (2) a per band basis. For example, on a per band per band combination basis, for band combinations [B1, B2] and [B1, B3], the UE 115-a may indicate [B1, B2]: B1→a1, B2→a2 and [B1, B3]: B1→a3, B3→a2. On a per band basis, for example, the UE 115-a may indicate B1→a1, B2→a2, B3→a3.

In some examples, the UE 115-a may indicate a scaling factor for the antenna cross-correlation information. The base station 105-a may use the scaling factor to derive the remaining correlations relative to a known or indicated correlation. The base station 105-a may know (e.g., as indicated or calculated) that the correlation value for $r_{01}$, and the base station 105-a may derive the remaining coefficients based on the scaling factor. For example, $r_{03}$, may be 0.5*the value of $r_{01}$, $r_{12}$ may be 0.25*the value of $r_{01}$, etc. The scaling factor is a complex number in some examples.

The UE 115-a may be configured to transmit the antenna cross-correlation information 225 in the uplink channel 210.

In some cases, the antenna cross-correlation information functions as a special-reciprocity capability indication. For example, the UE 115-*a* may transmit the antenna cross-correlation information 225 as part of channel state information (CSI) in PUCCH or PUSCH. The information may be transmitted in CSI on a semi-static/dynamic basis. In some examples, the base station 105-*a* may transmit a request to the UE 115-*a* to transmit the CSI including the antenna cross-correlation information 225. For example, the base station 105-*a* may transmit the request through RRC signaling, MAC CE signaling, downlink control information (DCI) based signaling, or a combination of these. In some examples, the UE 115-*a* may consider the size of the payload of the antenna cross-correlation information 225 when determining where to transmit the information. For example, if the information has a relatively large size (e.g., above a certain threshold), then the antenna cross-correlation information 225 may be transmitted on PUSCH, and if the information is below the threshold, then the information may be transmitted on PUCCH.

As such, UE 115-*a* may have a higher switching capability (e.g., may be able to sound most or all of the antenna elements), but the base station 105-*a* may configure the UE 115-*a* for partial sounding (e.g., lower switching capability/ constraint). Thus, the UE 115-*a* may report part of the CSI feedback (e.g., through an association to a CSI report/ transmission) including the antenna correlation parameters and/or model of the remaining SRS ports. In some examples, the UE 115-*a* reports the correlation parameters of all of the antennas (e.g., the sounded antenna elements and the unsounded elements) to the base station 105-*a*, and the base station may determine the characteristics of the downlink channel 205 based on some or all of the received correlation parameters. That is, the UE 115-*a* may perform SRS sounding on two of the four antennas, and report the correlation information for all four antennas.

Figure 3:
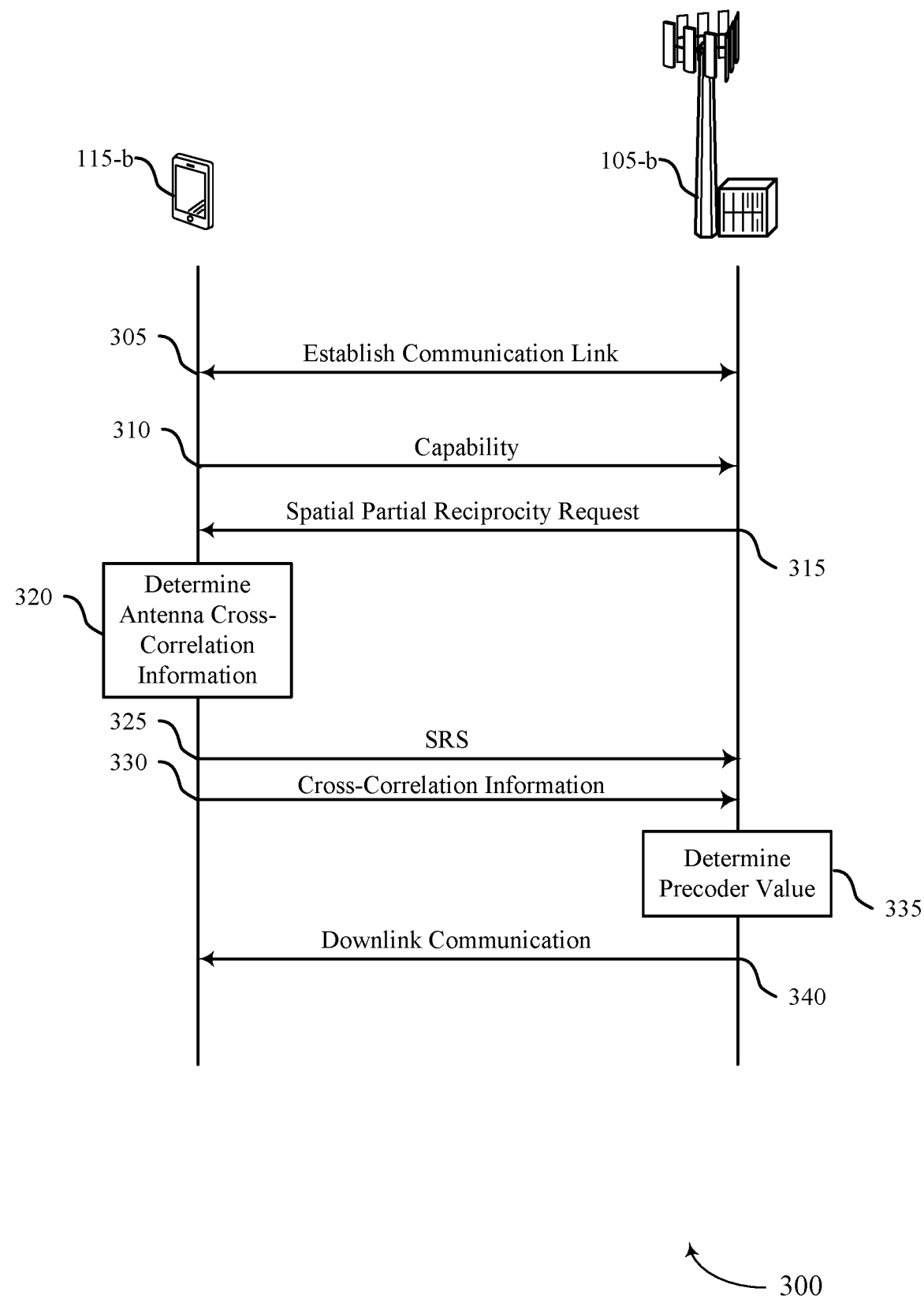
FIG. 3 illustrates an example of a process flow diagram that supports antenna correlation feedback for partial reciprocity situations in accordance with aspects of the present disclosure.

FIG. 3 illustrates an example of a process flow diagram 300 that supports antenna correlation feedback for partial reciprocity situations in accordance with aspects of the present disclosure. In some examples, process flow diagram 300 may implement aspects of wireless communication system 100. The process flow diagram 300 includes a UE 115-*b* and a base station 105-*b*, which may be examples of the corresponding devices of FIGS. 1 and 2.

At 305, the UE 115-*b* and the base station 105-*b* may establish a communication link. In some examples, the communication link is for receiving sounding reference. At 310, the UE 115-*b* may transmit an indication of a partial reciprocity capability of the UE based at least in part on establishing the communication link. The indicated capability may also include a sounding reference signal capability. For example, the UE 115-*b* may transmit, to the base station 105-*b*, a capability indicator specifying a first number of sounding reference signal ports that the UE is capable of sounding during a sounding period.

At 315, the base station 105-*b* may transmit a request to sound a second number of sounding reference signal ports different than the first number of sounding reference signal ports during the sounding period in accordance with the spatial partial reciprocity capability.

At 320, the UE 115-*b* determines antenna cross-correlation information for a first subset of antenna elements of the UE 115-*b*. In some examples, the UE 115-*b* determines cross-correlation information for each antenna element of the UE 115-*b*. The cross-correlation information may include a correlation model, one or more correlation parameters (e.g., correlation coefficients, antenna distances, alpha values, etc.).

At 325, the UE 115-*b* transmits, to the base station 105-*b*, a sounding reference signal for a second subset of antenna elements of the UE 115-*b* in accordance with the spatial partial reciprocity capability. In some examples, the sounding reference signal for the second subset of antenna elements is transmitted in accordance with the spatial partial reciprocity request.

At 330, the UE 115-*b* transmits, to the base station 105-*b*, the determined antenna cross-correlation information. Such information may include an indication of the antenna correlation model, one or more correlation parameters, or both. For example, the UE 115-*b* may transmit an average cross-correlation of the second set of antenna elements, cross-correlation values of a subset of the second subset of antenna elements, other parameters (e.g., antenna spatial distance) that the base station may utilize to derive correlations, etc. In some examples, the information is transmitted with channel state information on an uplink channel such as PUSCH or PUCCH. The information may correspond to a band or a band in a band combination.

At 335, the base station 105-*b* determines a precoder value for at least the first subset of antenna elements based at least in part on the received sounding reference signal for the second subset of antenna elements and the indication of the antenna cross-correlation information. The base station may utilize the indicated (or known) antenna model and received parameter values to determine the cross-correlation information for the first subset of antenna elements and use such information to derive the decoder value. At 340, the base station 105-*b* transmits a downlink communication having the determined decoder value.

Figure 4:
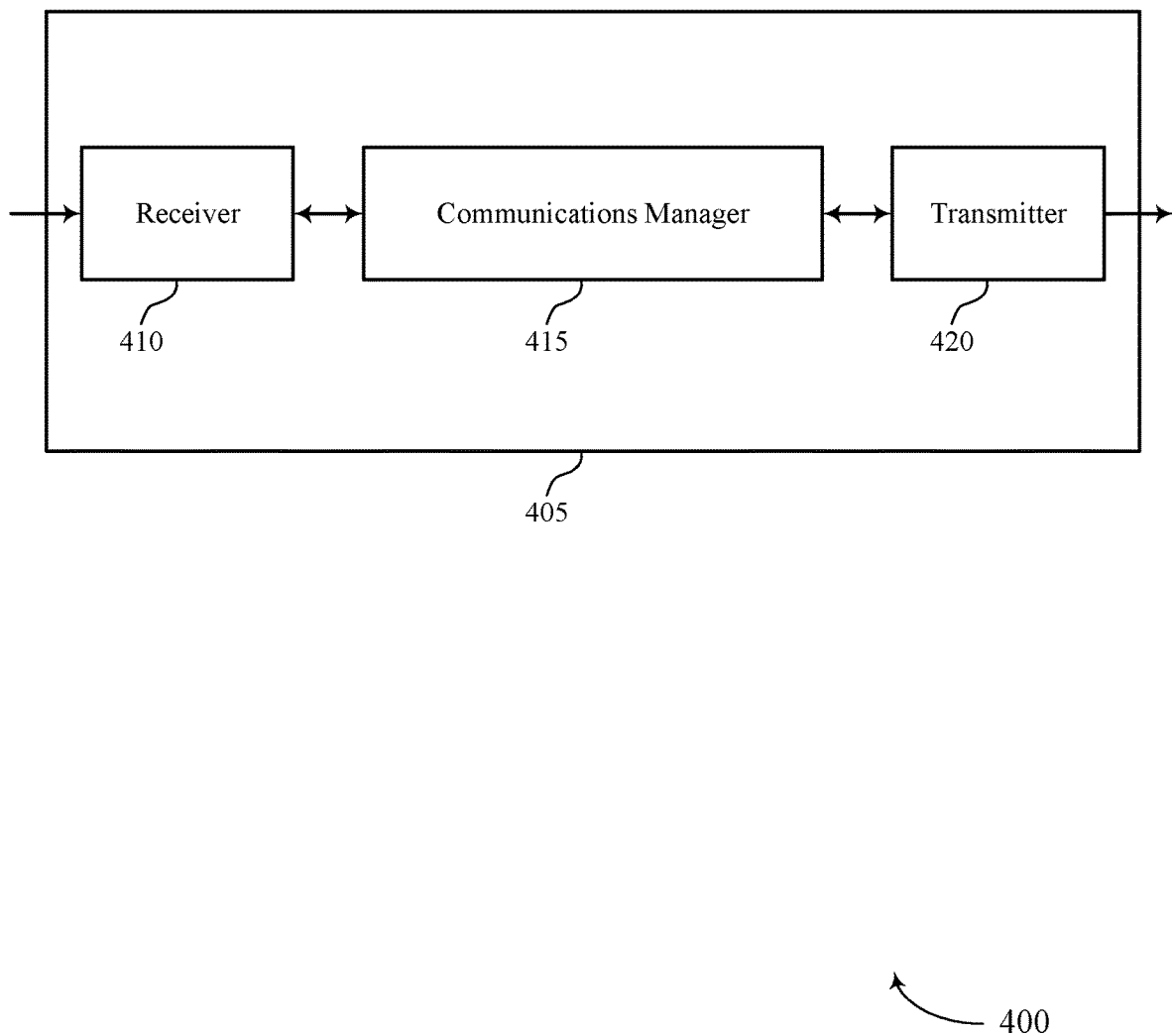
FIGS. 4 and 5 show block diagrams of devices that support antenna correlation feedback for partial reciprocity situations in accordance with aspects of the present disclosure.

FIG. 4 shows a block diagram 400 of a device 405 that supports antenna correlation feedback for partial reciprocity situations in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to antenna correlation feedback for partial reciprocity situations, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may establish a communication link with a base station, where the UE is configured to transmit sounding reference signals for the communication link. The communications manager 415 may transmit, to the base station, an indication of a partial reciprocity capability of the UE based at least in part on establishing the communication link. The communications manager 415 may determine antenna cross-correlation information for a first subset of antenna elements of the UE. Further, the communications manager 415 may transmit, to the base station, a sounding reference signal for a second subset of the antenna elements of the UE in accordance with the spatial partial reciprocity capability and an indication of the antenna cross-correlation information for the first subset of antenna elements of the UE. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 (e.g., UE 115) to more efficiently coordinate a downlink channel between the UE 115 and a base station 105, and more specifically to sound a subset of antenna elements (e.g., transmit SRS for) and still provide enough information (e.g., using antenna cross-correlation information) to coordinate downlink channel characteristics (e.g., precoder values).

Based on implementing the antenna cross-correlation techniques as described herein, a processor of a UE 115 (e.g., controlling the receiver 410, the transmitter 420, or the transceiver 720 as described with reference to FIG. 7) may realize advantages such as increased reliability and decreased signaling overhead in the communication of correlation information because each antenna element may not be sounded (thus saving resources such as processing and power resources).

Figure 5:
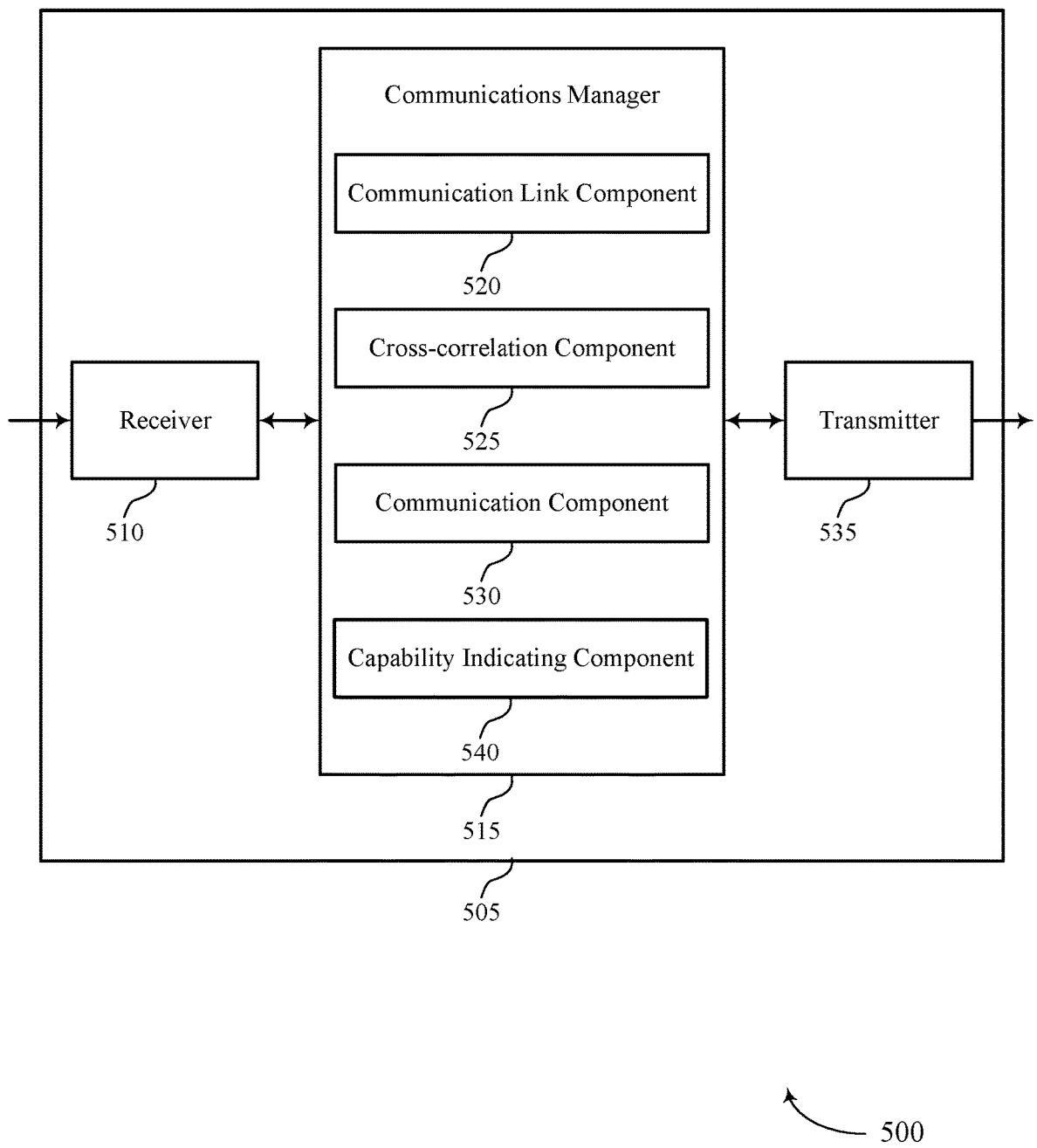

FIG. 5 shows a block diagram 500 of a device 505 that supports antenna correlation feedback for partial reciprocity situations in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to antenna correlation feedback for partial reciprocity situations, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a communication link component 520, a cross-correlation component 525, a communication component 530, and a capability indicating component 540. The communications manager 515 may be an example of aspects of the communications manager 710 described herein.

The communication link component 520 may establish a communication link with a base station, where the UE is configured to transmit sounding reference signals for the communication link. The cross-correlation component 525 may determine antenna cross-correlation information for a first subset of antenna elements of the UE.

The capability indicating component 540 may transmit, to the base station, an indication of a partial reciprocity capability of the UE based at least in part on establishing the communication link.

The communication component 530 may transmit, to the base station, a sounding reference signal for a second subset of the antenna elements of the UE in accordance with the spatial partial reciprocity capability and an indication of the antenna cross-correlation information for the first subset of antenna elements of the UE.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
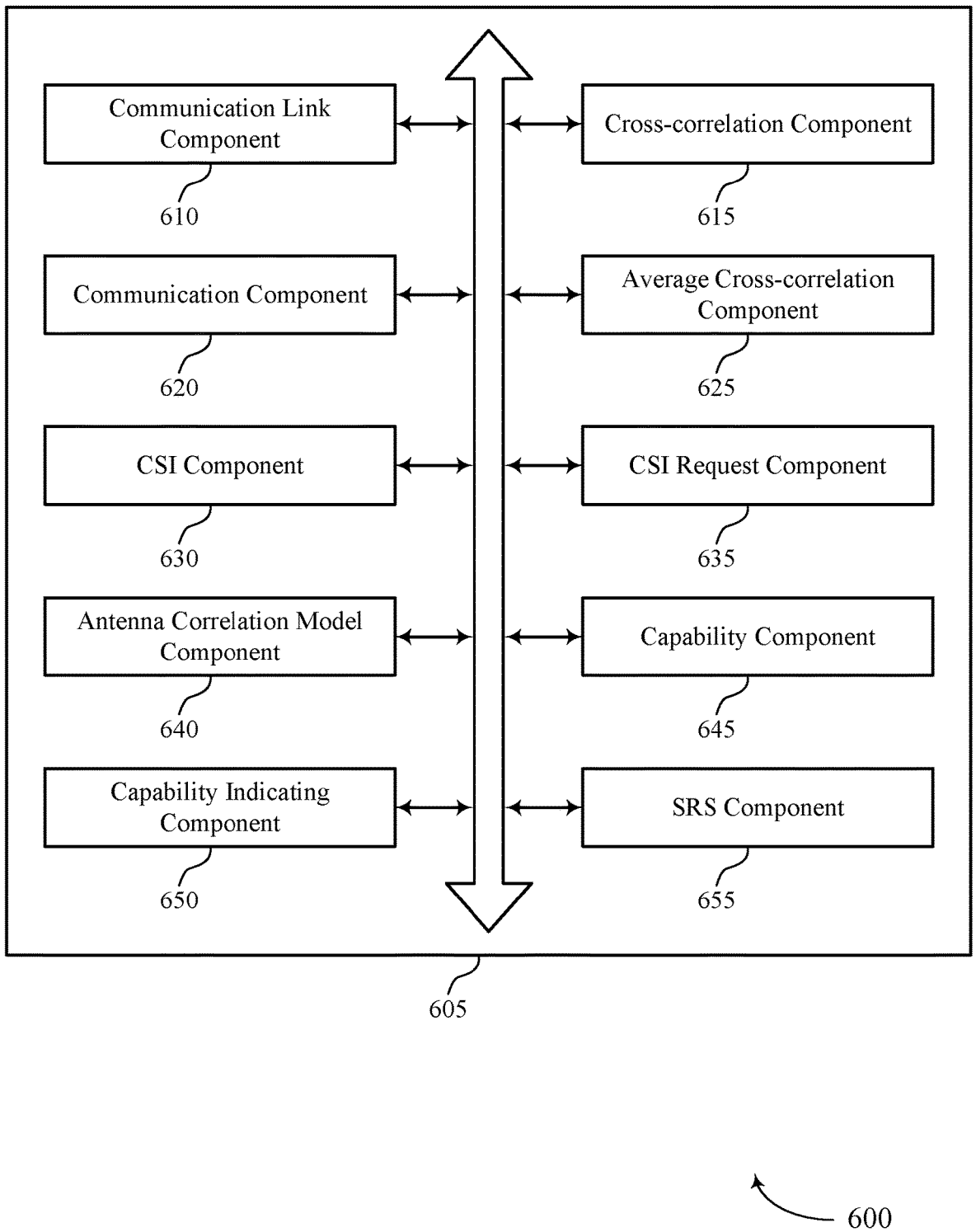
FIG. 6 shows a block diagram of a communications manager that supports antenna correlation feedback for partial reciprocity situations in accordance with aspects of the present disclosure.

FIG. 6 shows a block diagram 600 of a communications manager 605 that supports antenna correlation feedback for partial reciprocity situations in accordance with aspects of the present disclosure. The communications manager 605 may be an example of aspects of a communications manager 415, a communications manager 515, or a communications manager 710 described herein. The communications manager 605 may include a communication link component 610, a cross-correlation component 615, a communication component 620, an average cross-correlation component 625, a CSI component 630, a CSI request component 635, an antenna correlation model component 640, a capability component 645, a capability indicating component 650, and a SRS component 655. Each of these modules may communicate, directly or indirectly, with one another (e.g., via one or more buses).

The communication link component 610 may establish a communication link with a base station, where the UE is configured to transmit sounding reference signals for the communication link. The capability indicating component 650 may transmit, to the base station, an indication of a partial reciprocity capability of the UE based at least in part on establishing the communication link. The cross-correlation component 615 may determine antenna cross-correlation information for a first subset of antenna elements of the UE.

In some examples, determining at least one cross-correlation value corresponding to at least one cross-correlation of at least two antenna elements of the first subset of antenna elements in accordance with the antenna correlation model, where transmitting the one or more correlation parameters includes transmitting the at least one cross-correlation value. In some examples, each unsounded sounding reference signal port corresponds to a physical antenna of the UE.

In some examples, the sounding reference signal and the antenna cross-correlation information indicate a precoder value for receiving downlink communications on each receive antenna of the UE. In some examples, the antenna cross-correlation information indicates an envelope correlation between cross-polarized antenna elements.

The communication component 620 may transmit, to the base station, a sounding reference signal for a second subset of the antenna elements of the UE in accordance with the spatial partial reciprocity capability and an indication of the antenna cross-correlation information for the first subset of antenna elements of the UE. In some examples, the communication component 620 may transmit one or more correlation parameters, an indication of an antenna correlation model, or both.

In some examples, the communication component 620 may transmit the one or more correlation parameters including a distance between two antenna elements, a reference correlation value, a scaling factor indicating correlation values for at least some of the first subset of antenna elements relative to a correlation value of one or more of the second subset of antenna elements, or any combination thereof. In some examples, the communication component 620 may transmit the one or more correlation parameters or the indication of the antenna correlation model on a per band or per band per band combination basis.

In some examples, the communication component 620 may transmit the one or more correlation parameters corresponding to a spatial correlation matrix, an antenna imbalance, or both. In some examples, the communication component 620 may receive, from the base station, a downlink communication having a precoding determined in accordance with the sounding reference signal and the antenna cross-correlation information.

The average cross-correlation component 625 may determine an average cross-correlation of at least some of the first subset of antenna elements in accordance with the antenna correlation model, where transmitting the one or more correlation parameters includes transmitting the average cross-correlation of the first subset of antenna elements.

The CSI component 630 may transmit channel state information to the base station, where the channel state information includes an indication of an antenna correlation value of unsounded sounding reference signal ports including the second subset of antenna elements, an indication of the antenna correlation model, or both.

In some examples, the CSI component 630 may transmit the channel state information on a physical uplink control channel or a physical uplink shared channel. In some examples, the CSI component 630 may determine to transmit the channel state information on the physical uplink control channel or the physical uplink shared channel based at least in part on a size of the channel state information. In some examples, the channel state information is transmitted to the base station on a semi-static basis or a dynamic basis.

The CSI request component 635 may receive, from the base station, a request for the channel state information, where the channel state information is transmitted based on the received request.

In some examples, the antenna correlation model is based on an antenna spatial separation between at least two antennas of the antenna elements and a reference correlation value indicating an envelope correlation between two cross-polarized antenna elements.

In some examples, the antenna correlation model is based on an antenna spatial separation between at least two antennas of the antenna elements, a reference correlation value indicating an envelope correlation between two cross-polarized antenna elements, and a number of antennas.

In some examples, the antenna correlation model is based on a first reference correlation value of cross-polarized antenna elements in a first dimension, a second reference correlation value of cross-polarized antenna elements in a second dimension, a correlation value of cross-polarized antenna elements having different polarizations, or a combination thereof. In some examples, the antenna elements include physical antennas, sounding reference signal ports, or both.

In some examples, the first subset of antenna elements includes at least each antenna element of the second subset antenna elements. In some examples, the first subset of antenna elements is different from the second subset of antenna elements. The capability indicating component 650 may transmit, to the base station, a capability indicator specifying a first number of sounding reference signal ports that the UE is capable of sounding during a sounding period.

The SRS component 655 may receive, from the base station, a request to sound a second number of sounding reference signal ports different than the first number of sounding reference signal ports during the sounding period in accordance with the spatial partial reciprocity capability, where the sounding reference signal for the second subset of antenna elements is transmitted in accordance with the request.

Figure 7:
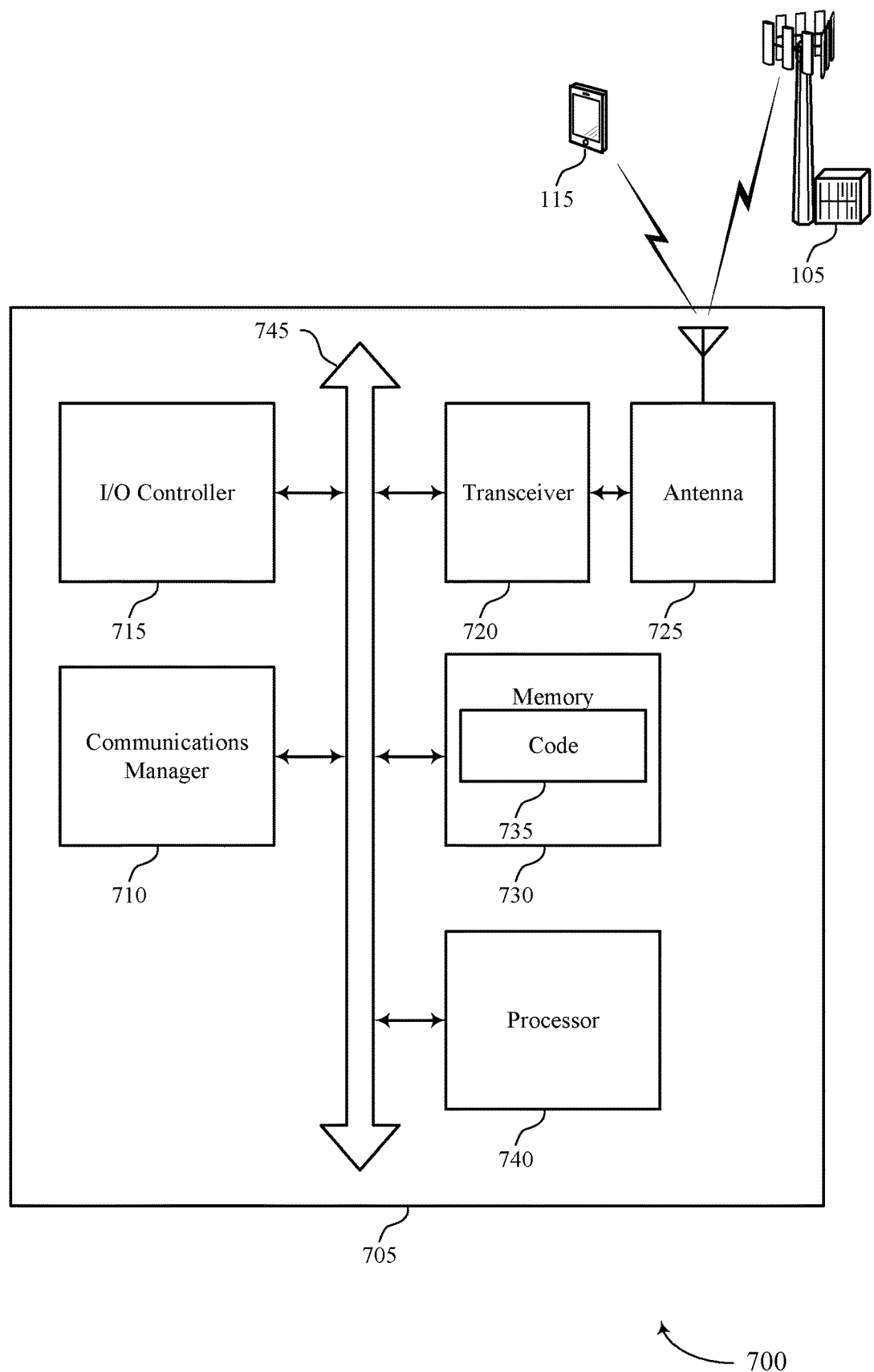
FIG. 7 shows a diagram of a system including a device that supports antenna correlation feedback for partial reciprocity situations in accordance with aspects of the present disclosure.

FIG. 7 shows a diagram of a system 700 including a device 705 that supports antenna correlation feedback for partial reciprocity situations in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may establish a communication link with a base station, where the UE is configured to transmit sounding reference signals for the communication link. The communications manager 710 may transmit, to the base station, an indication of a partial reciprocity capability of the UE based at least in part on establishing the communication link. The communications manager 710 may determine antenna cross-correlation information for a first subset of antenna elements of the UE. The communications manager 710 may transmit, to the base station, a sounding reference signal for a second subset of the antenna elements of the UE in accordance with the spatial partial reciprocity capability and an indication of the antenna cross-correlation information for the first subset of antenna elements of the UE.

The I/O controller 715 may manage input and output signals for the device 705. The I/O controller 715 may also manage peripherals not integrated into the device 705. In some examples, the I/O controller 715 may represent a physical connection or port to an external peripheral. In some examples, the I/O controller 715 may utilize an operating system such as iOS®, ANDROID®, MS-DOS®, MS-WINDOWS®, OS/2 ®, UNIX®, LINUX®, or another known operating system. In other examples, the I/O controller 715 may represent or interact with a modem, a keyboard, a mouse, a touchscreen, or a similar device. In some examples, the I/O controller 715 may be implemented as part of a processor. In some examples, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some examples, the wireless device may include a single antenna 725. However, in some examples the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some examples, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In other examples, a memory controller may be integrated into the processor 740. The processor 740 may be configured to execute computer-readable instructions stored in a memory (e.g., the memory 730) to cause the device 705 to perform various functions (e.g., functions or tasks supporting antenna correlation feedback for partial reciprocity situations).

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (e.g., when compiled and executed) to perform functions described herein.

Figure 8:
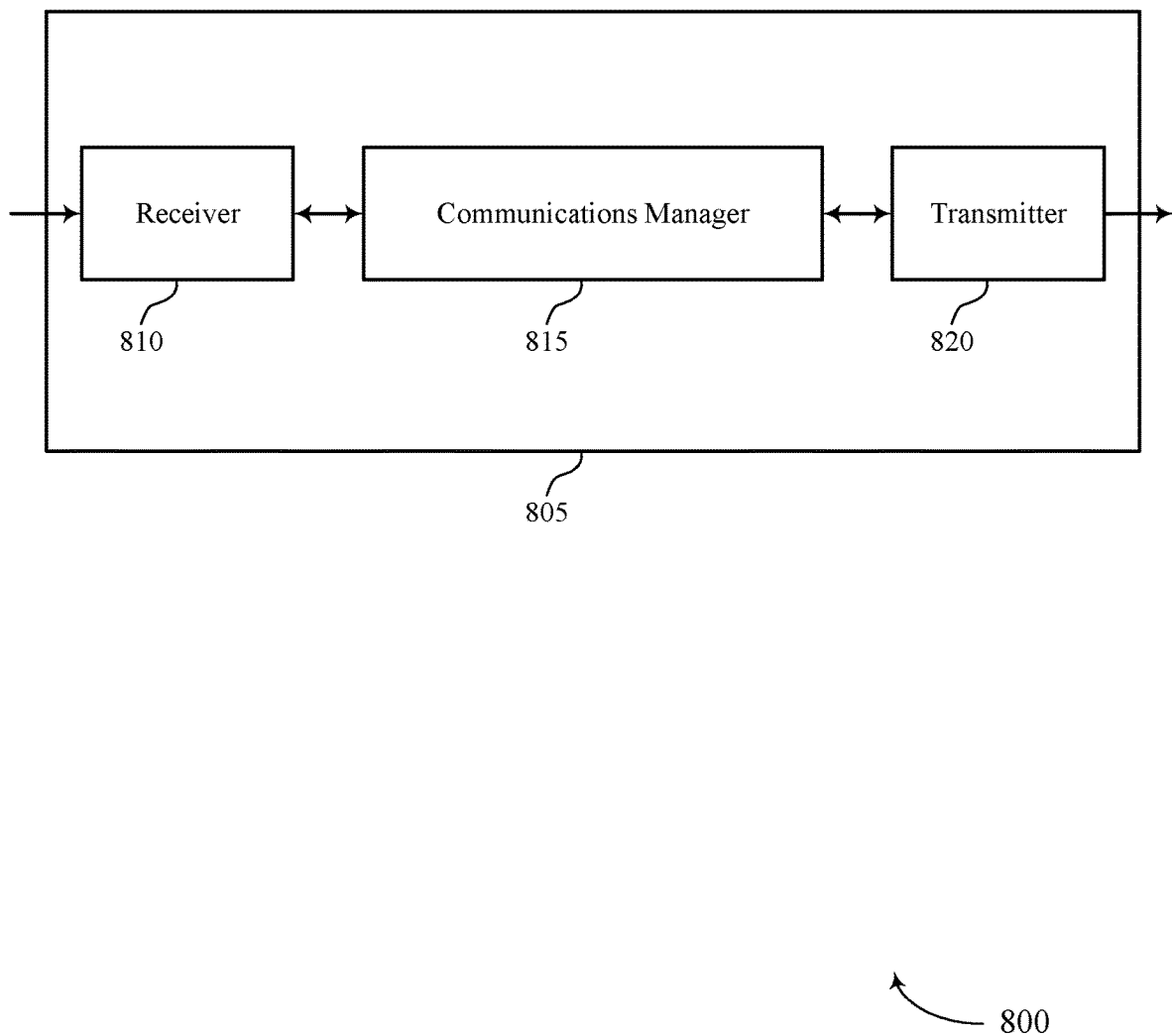
FIGS. 8 and 9 show block diagrams of devices that support antenna correlation feedback for partial reciprocity situations in accordance with aspects of the present disclosure.

FIG. 8 shows a block diagram 800 of a device 805 that supports antenna correlation feedback for partial reciprocity situations in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to antenna correlation feedback for partial reciprocity situations, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may establish a communication link with a UE, the communication link for receiving sounding reference signals in accordance with a spatial partial reciprocity capability. The communications manager 815 may receive one or more sounding reference signal for a second subset of antenna elements of the UE in accordance with the spatial partial reciprocity capability and an indication of antenna cross-correlation information corresponding to a first subset of antenna elements at the UE. The communications manager 815 may determine a precoder value for at least the first subset of antenna elements based on the received sounding reference signal for the second subset of antenna elements and the indication of the antenna cross-correlation information. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
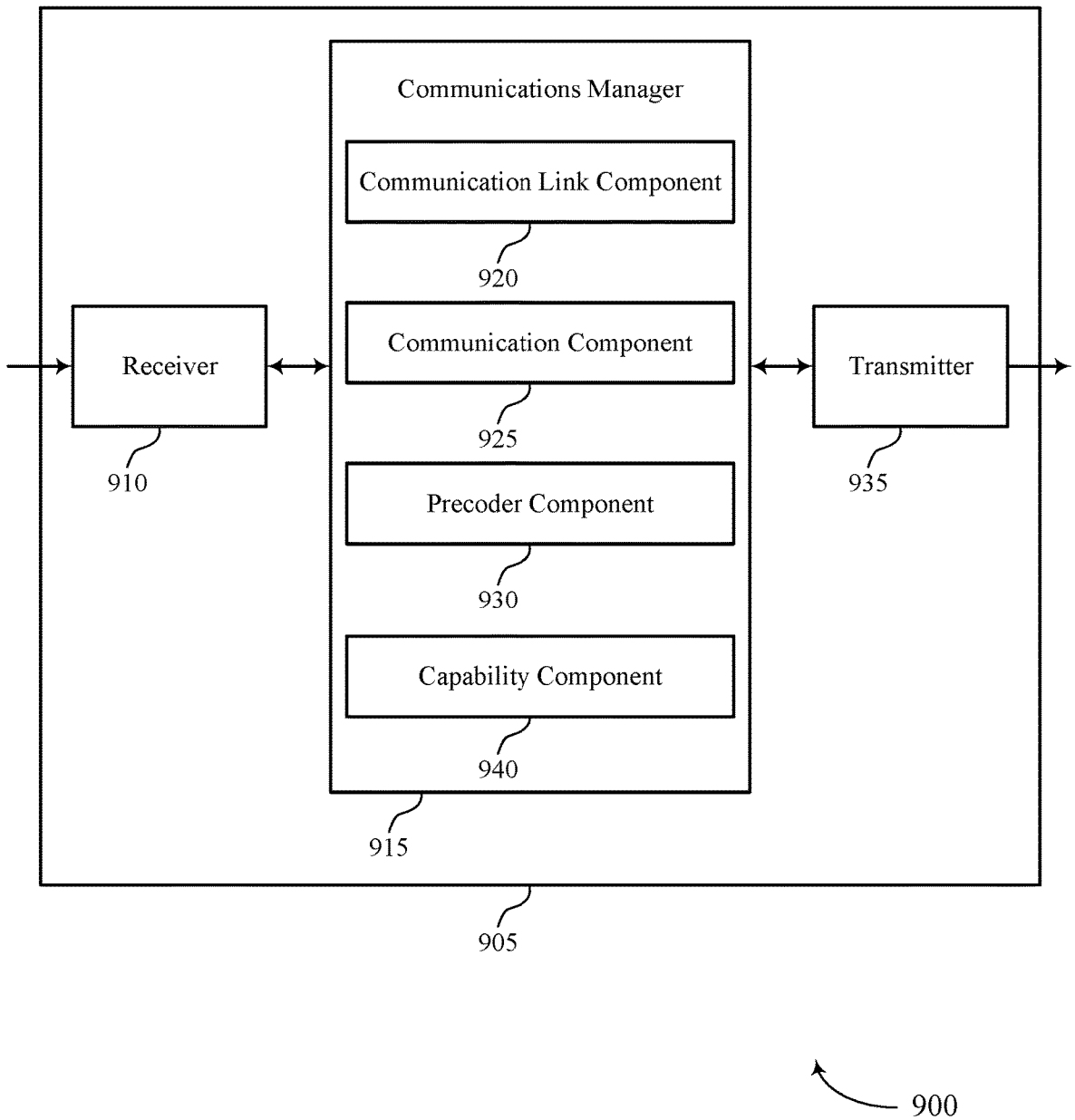

FIG. 9 shows a block diagram 900 of a device 905 that supports antenna correlation feedback for partial reciprocity situations in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to antenna correlation feedback for partial reciprocity situations, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a communication link component 920, a communication component 925, a capability component, and a precoder component 930. The communications manager 915 may be an example of aspects of the communications manager 1110 described herein.

The communication link component 920 may establish a communication link with a UE, the communication link for receiving sounding reference signals.

The capability component 940 may receive, from the UE and based at least in part on establishing the communicating link, an indication of a partial reciprocity capability of the UE.

The communication component 925 may receive one or more sounding reference signal for a second subset of antenna elements of the UE in accordance with the spatial partial reciprocity capability and an indication of antenna cross-correlation information corresponding to a first subset of antenna elements at the UE.

The precoder component 930 may determine a precoder value for at least the first subset of antenna elements based on the received sounding reference signal for the second subset of antenna elements and the indication of the antenna cross-correlation information.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
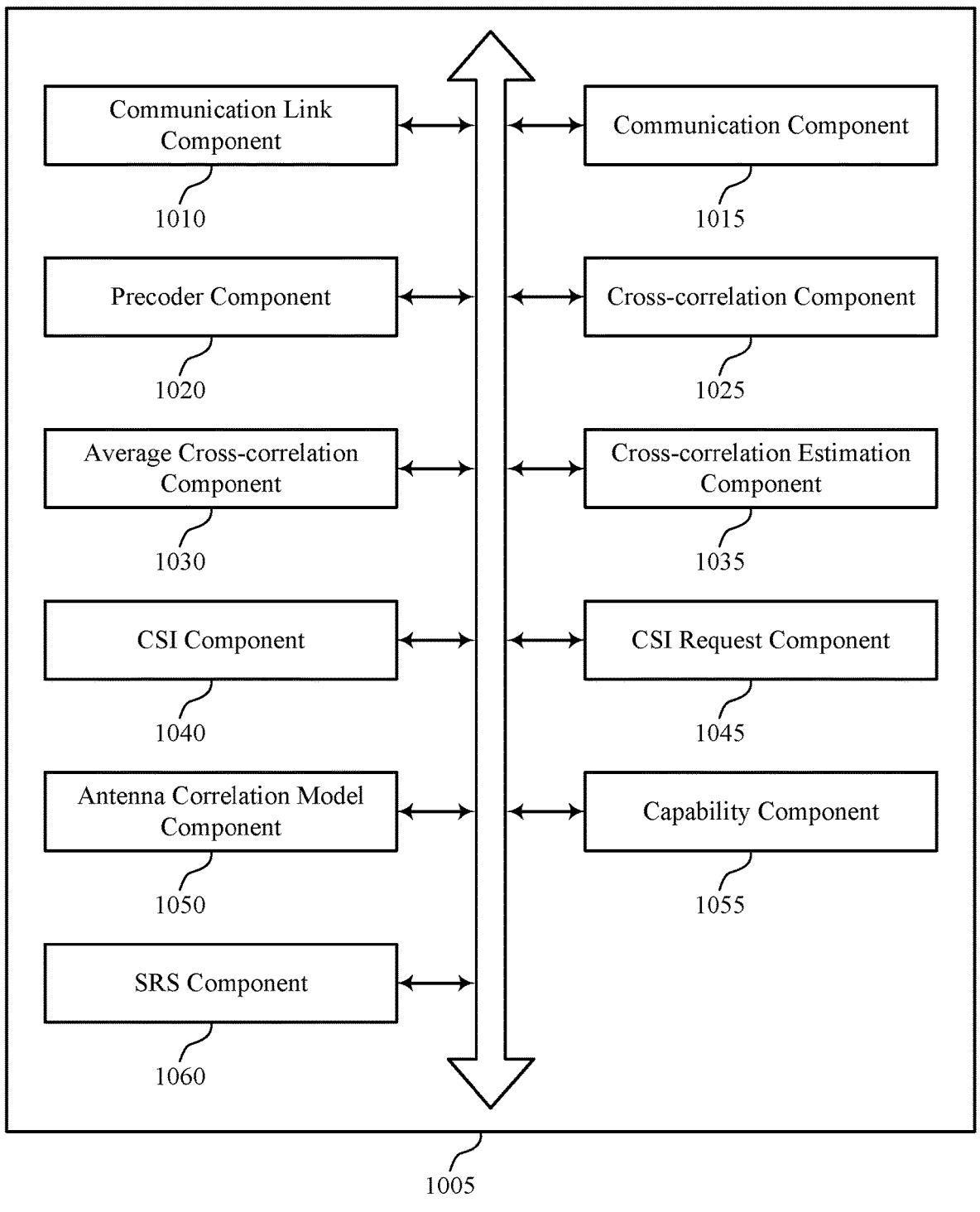
FIG. 10 shows a block diagram of a communications manager that supports antenna correlation feedback for partial reciprocity situations in accordance with aspects of the present disclosure.

FIG. 10 shows a block diagram 1000 of a communications manager 1005 that supports antenna correlation feedback for partial reciprocity situations in accordance with aspects of the present disclosure. The communications manager 1005 may be an example of aspects of a communications manager 815, a communications manager 915, or a communications manager 1110 described herein. The communications manager 1005 may include a communication link component 1010, a communication component 1015, a precoder component 1020, a cross-correlation component 1025, an average cross-correlation component 1030, a cross-correlation estimation component 1035, a CSI component 1040, a CSI request component 1045, an antenna correlation model component 1050, a capability component 1055, and a SRS component 1060. Each of these modules may communicate, directly or indirectly, with one another (e.g., via one or more buses).

The communication link component 1010 may establish a communication link with a UE, the communication link for receiving sounding reference signals.

The capability component 1055 may receive, from the UE and based at least in part on establishing the communication link, an indication of a partial reciprocity capability of the UE.

The communication component 1015 may receive one or more sounding reference signal for a second subset of antenna elements of the UE in accordance with the spatial partial reciprocity capability and an indication of antenna cross-correlation information corresponding to a first subset of antenna elements at the UE.

In some examples, the communication component 1015 may transmit, to the UE, a downlink communication having a precoding determined in accordance with the sounding reference signal and the antenna cross-correlation information. In some examples, the communication component 1015 may determine the precoder value for the second subset of antenna elements of the UE based on the sounding reference signal and the antenna cross-correlation information.

The precoder component 1020 may determine a precoder value for at least the first subset of antenna elements based on the received sounding reference signal for the second subset of antenna elements and the indication of the antenna cross-correlation information. The cross-correlation component 1025 may receive one or more correlation parameters, an indication of an antenna correlation model, or both.

In some examples, the cross-correlation component 1025 may receive a distance between two antenna elements, a reference correlation value, a scaling factor indicating correlation values for at least some of the first subset of antenna elements relative to a correlation value of one or more of the second subset of antenna elements, or any combination thereof.

In some examples, the cross-correlation component 1025 may receive the one or more correlation parameters corresponding to a spatial correlation matrix, an antenna imbalance, or both. In some examples, the one or more correlation parameters, the indication of the antenna correlation model, or both correspond to a band or a band of a band combination.

In some examples, the antenna cross-correlation information indicates an envelope correlation between cross-polarized antenna elements. The average cross-correlation component 1030 may receive the one or more correlation parameters including an average cross-correlation of the first subset of antenna elements, where the precoder value for the first subset of antenna elements is determined based on the average cross-correlation.

The cross-correlation estimation component 1035 may estimate a second cross-correlation value corresponding to a second cross-correlation of a second pair of antenna elements of the first subset of antenna elements based on the at least one first cross-correlation value and the antenna correlation model.

In some examples, the cross-correlation estimation component 1035 may estimate a reference correlation based on the at least one first cross-correlation value, where the second cross-correlation value is determined based on the estimated reference correlation.

The CSI component 1040 may receive channel state information from the UE, where the channel state information includes an indication of an antenna correlation value of unsounded sounding reference signal ports including the second subset of antenna elements, an indication of the antenna correlation model, or both. In some examples, the channel state information is received from the UE on a semi-static basis or a dynamic basis. In some examples, the channel state information is received on a physical uplink control channel or a physical uplink shared channel.

The CSI request component 1045 may transmit, to the UE, a request for the channel state information, where the channel state information is received based on the transmitted request.

In some examples, the antenna correlation model is based on an antenna spatial separation between at least two antennas of the antenna elements and a reference correlation value indicating an envelope correlation between two cross-polarized antenna elements. In some examples, the antenna correlation model is based on an antenna spatial separation between at least two antennas of the antenna elements, a reference correlation value indicating an envelope correlation between two cross-polarized antenna elements, and a number of antennas.

In some examples, the antenna correlation model is based on a first reference correlation value of cross-polarized antenna elements in a first dimension, a second reference correlation value of cross-polarized antenna elements in a second dimension, a correlation value of cross-polarized antenna elements having different polarizations, or a combination thereof.

The capability component 1055 may receive, from the UE, a capability indicator specifying a first number of sounding reference signal ports that the UE is capable of sounding during a sounding period.

In some examples, the first subset of antenna elements includes each antenna element of the second subset of antenna element. In some examples, the first subset of antenna elements is different from the second subset of antenna elements. In some examples, the antenna elements include physical antennas, sounding reference signal ports, or both.

The SRS component 1060 may transmit, to the UE, a request to sound a second number of sounding reference signal ports different than the first number of sounding reference signal ports during the sounding period in accordance with the spatial partial reciprocity capability, where the sounding reference signal for the second subset of antenna elements is received in accordance with the request.

Figure 11:
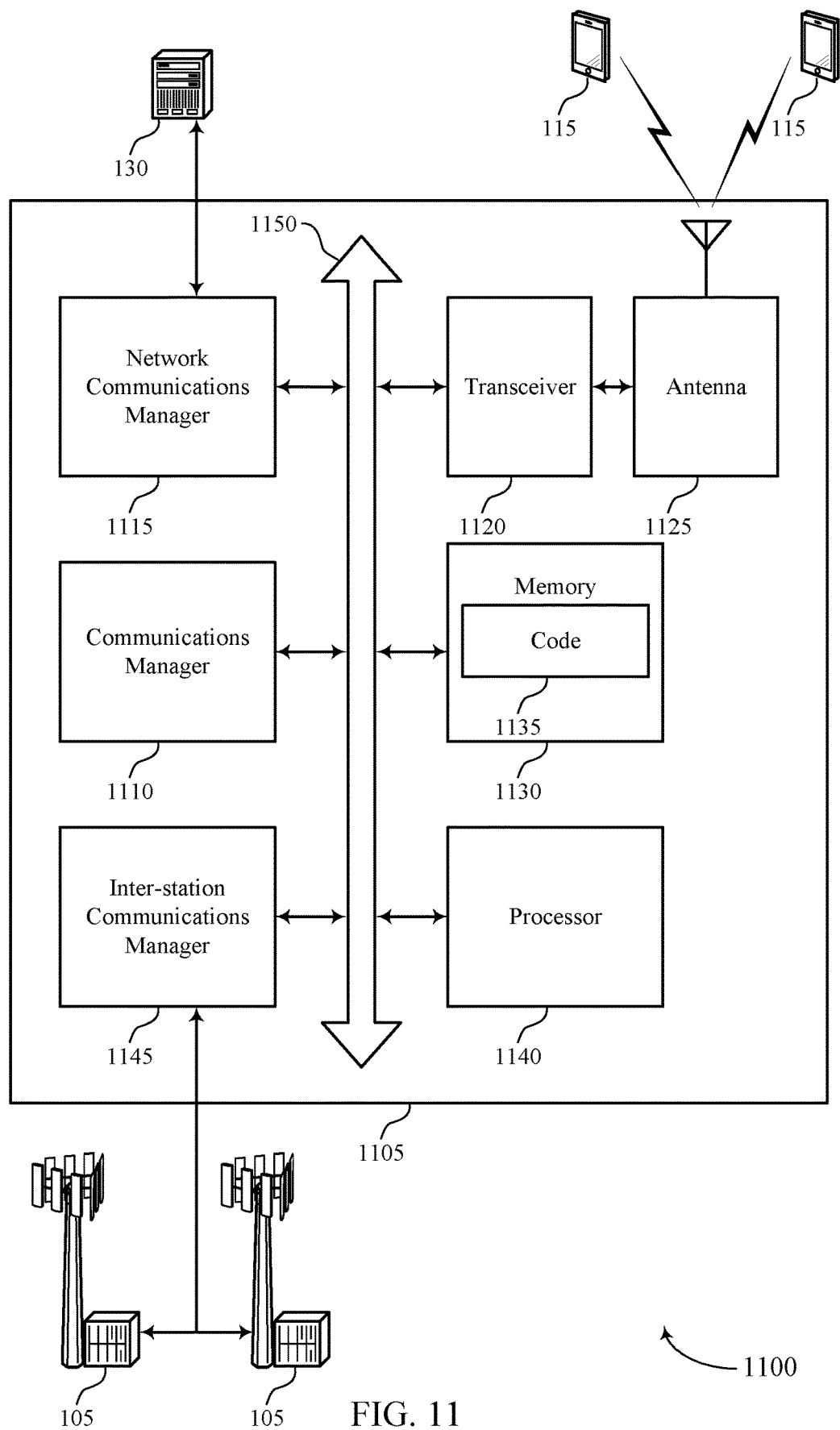
FIG. 11 shows a diagram of a system including a device that supports antenna correlation feedback for partial reciprocity situations in accordance with aspects of the present disclosure.

FIG. 11 shows a diagram of a system 1100 including a device 1105 that supports antenna correlation feedback for partial reciprocity situations in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may establish a communication link with a UE, the communication link for receiving sounding reference signals in accordance with a spatial partial reciprocity capability. The communications manager 1110 may receive one or more sounding reference signal for a second subset of antenna elements of the UE in accordance with the spatial partial reciprocity capability and an indication of antenna cross-correlation information corresponding to a first subset of antenna elements at the UE. The communications manager 1110 may determine a precoder value for at least the first subset of antenna elements based on the received sounding reference signal for the second subset of antenna elements and the indication of the antenna cross-correlation information.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some examples, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some examples, a memory controller may be integrated into processor 1140. The processor 1140 may be configured to execute computer-readable instructions stored in a memory (e.g., the memory 1130) to cause the device 1105 to perform various functions (e.g., functions or tasks supporting antenna correlation feedback for partial reciprocity situations).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (e.g., when compiled and executed) to perform functions described herein.

Figure 12:
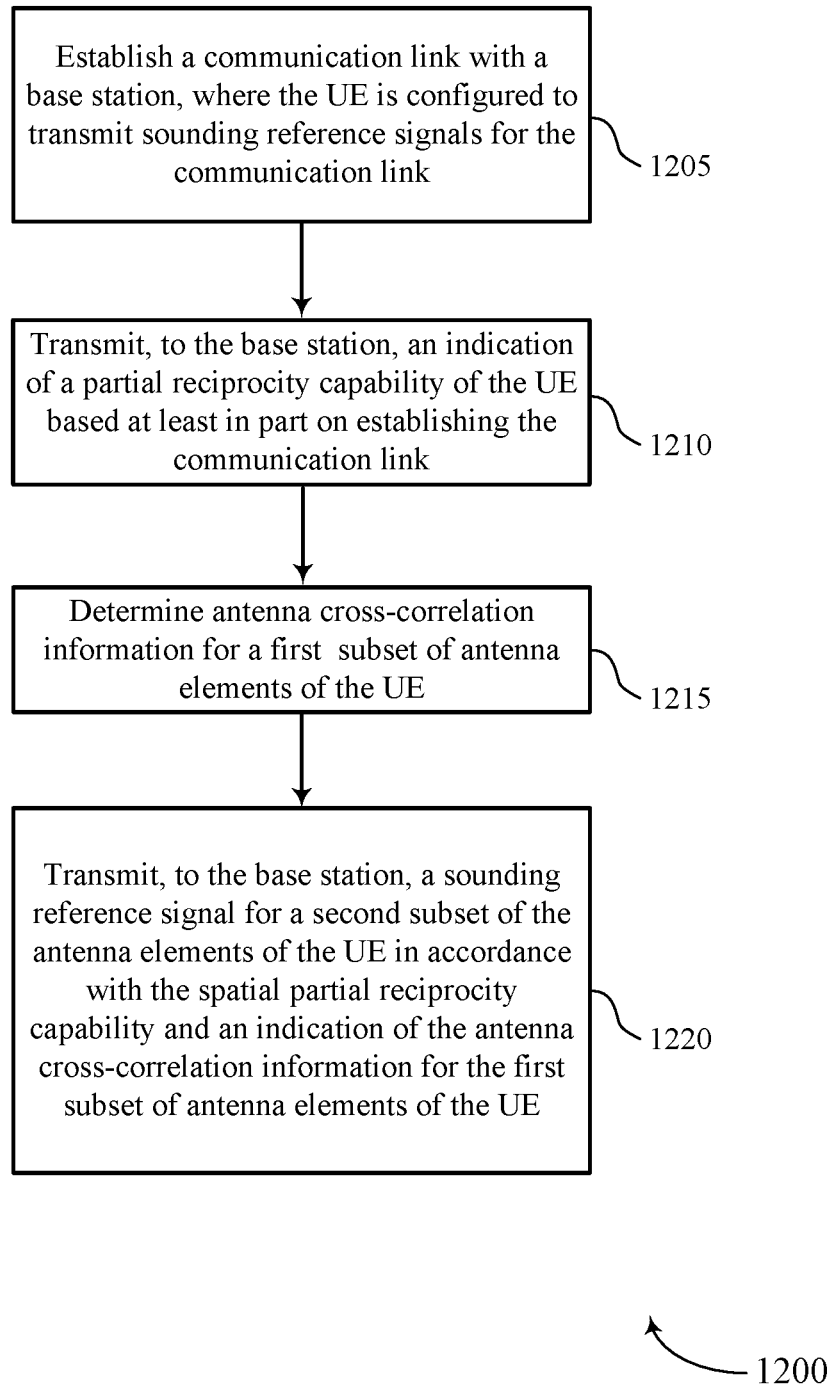
FIGS. 12 through 15 show flowcharts illustrating methods that support antenna correlation feedback for partial reciprocity situations in accordance with aspects of the present disclosure.

FIG. 12 shows a flowchart illustrating a method 1200 that supports antenna correlation feedback for partial reciprocity situations in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may establish a communication link with a base station, where the UE is configured to transmit sounding reference signals for the communication link. The operations of 1205 may be performed according to the methods described herein. In some examples, aspects of the operations of 1205 may be performed by a communication link component as described with reference to FIGS. 4 through 7.

At 1210, the UE may transmit, to the base station, an indication of a partial reciprocity capability of the UE based at least in part on establishing the communication link. The operations of 1210 may be performed according to the methods described herein. In some examples, aspects of the operations of 1210 may be performed by a capability indicating component as described with reference to FIGS. 4 through 7.

At 1215, the UE may determine antenna cross-correlation information for a first subset of antenna elements of the UE. The operations of 1215 may be performed according to the methods described herein. In some examples, aspects of the operations of 1215 may be performed by a cross-correlation component as described with reference to FIGS. 4 through 7.

At 1220, the UE may transmit, to the base station, a sounding reference signal for a second subset of the antenna elements of the UE in accordance with the spatial partial reciprocity capability and an indication of the antenna cross-correlation information for the first subset of antenna elements of the UE. The operations of 1220 may be performed according to the methods described herein. In some examples, aspects of the operations of 1220 may be performed by a communication component as described with reference to FIGS. 4 through 7.

Figure 13:
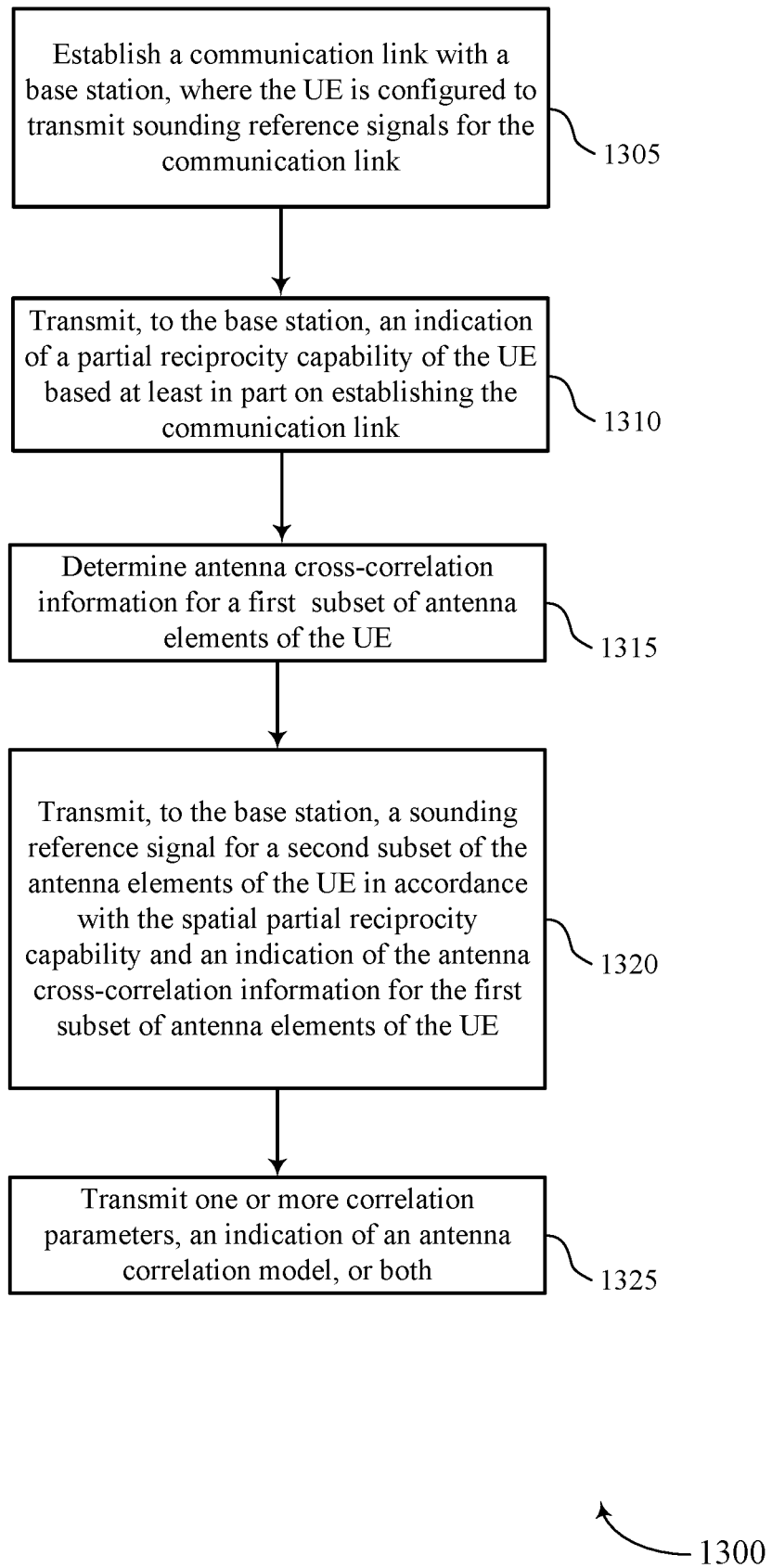

FIG. 13 shows a flowchart illustrating a method 1300 that supports antenna correlation feedback for partial reciprocity situations in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may establish a communication link with a base station, where the UE is configured to transmit sounding reference signals for the communication link. The operations of 1305 may be performed according to the methods described herein. In some examples, aspects of the operations of 1305 may be performed by a communication link component as described with reference to FIGS. 4 through 7.

At 1310, the UE may transmit, to the base station, an indication of a partial reciprocity capability of the UE based at least in part on establishing the communication link. The operations of 1310 may be performed according to the methods described herein. In some examples, aspects of the operations of 1310 may be performed by a capability indicating component as described with reference to FIGS. 4 through 7.

At 1315, the UE may determine antenna cross-correlation information for a first subset of antenna elements of the UE. The operations of 1315 may be performed according to the methods described herein. In some examples, aspects of the operations of 1310 may be performed by a cross-correlation component as described with reference to FIGS. 4 through 7.

At 1320, the UE may transmit, to the base station, a sounding reference signal for a second subset of the antenna elements of the UE in accordance with the spatial partial reciprocity capability and an indication of the antenna cross-correlation information for the first subset of antenna elements of the UE. The operations of 1320 may be performed according to the methods described herein. In some examples, aspects of the operations of 1315 may be performed by a communication component as described with reference to FIGS. 4 through 7.

At 1325, the UE may transmit one or more correlation parameters, an indication of an antenna correlation model, or both. The operations of 1325 may be performed according to the methods described herein. In some examples, aspects of the operations of 1320 may be performed by a communication component as described with reference to FIGS. 4 through 7.

Figure 14:
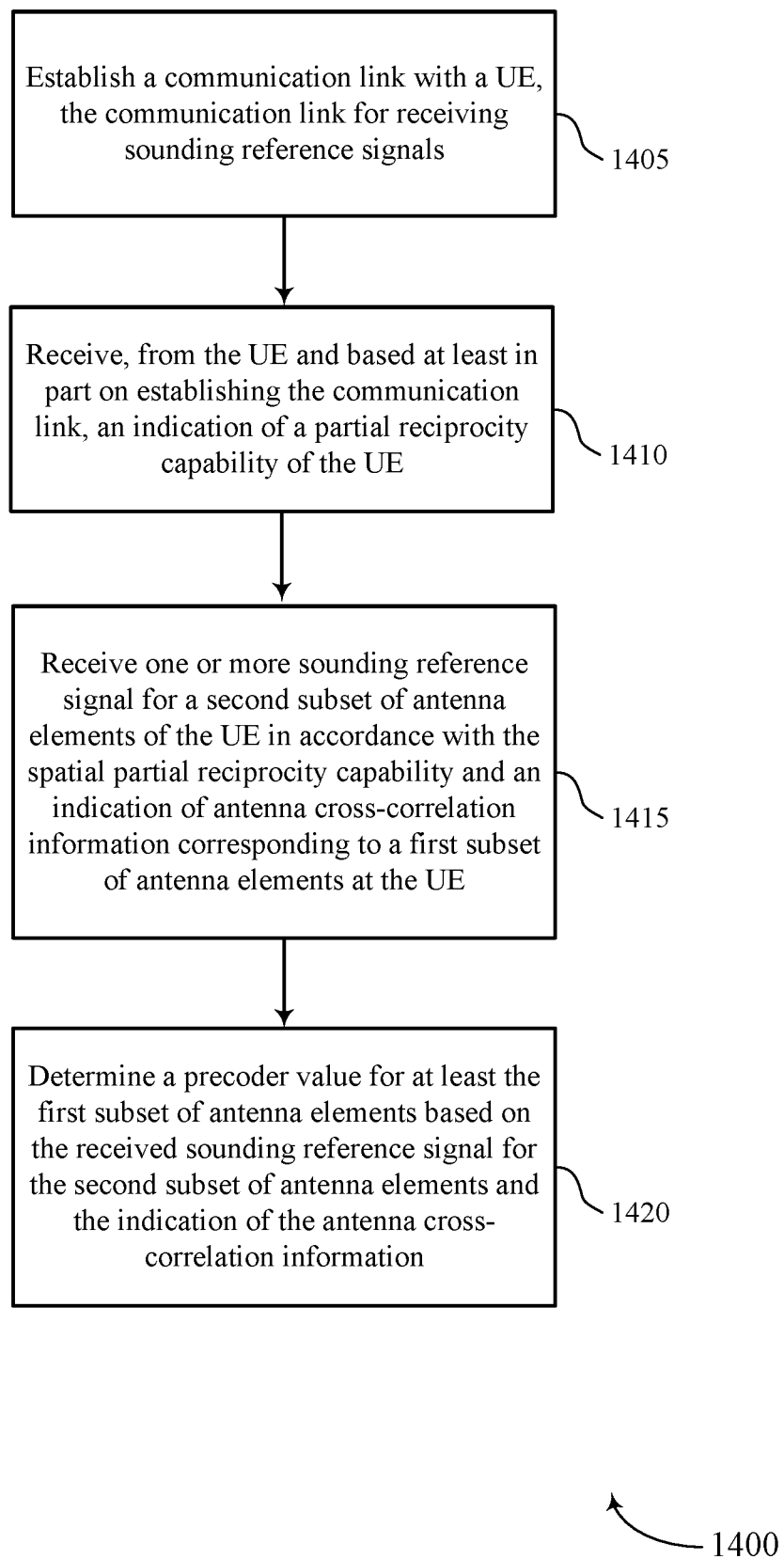

FIG. 14 shows a flowchart illustrating a method 1400 that supports antenna correlation feedback for partial reciprocity situations in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may establish a communication link with a UE, the communication link for receiving sounding reference signals. The operations of 1405 may be performed according to the methods described herein. In some examples, aspects of the operations of 1405 may be performed by a communication link component as described with reference to FIGS. 8 through 11.

At 1410, the base station may receive, from the UE and based at least in part on establishing the communication link, an indication of a partial reciprocity capability of the UE. The operations of 1410 may be performed according to the methods described herein. In some examples, aspects of the operations of 1410 may be performed by a capability component as described with reference to FIGS. 8 through 11.

At 1415, the base station may receive one or more sounding reference signal for a second subset of antenna elements of the UE in accordance with the spatial partial reciprocity capability and an indication of antenna cross-correlation information corresponding to a first subset of antenna elements at the UE. The operations of 1415 may be performed according to the methods described herein. In some examples, aspects of the operations of 1415 may be performed by a communication component as described with reference to FIGS. 8 through 11.

At 1420, the base station may determine a precoder value for at least the first subset of antenna elements based on the received sounding reference signal for the second subset of antenna elements and the indication of the antenna cross-correlation information. The operations of 1420 may be performed according to the methods described herein. In some examples, aspects of the operations of 1420 may be performed by a precoder component as described with reference to FIGS. 8 through 11.

Figure 15:
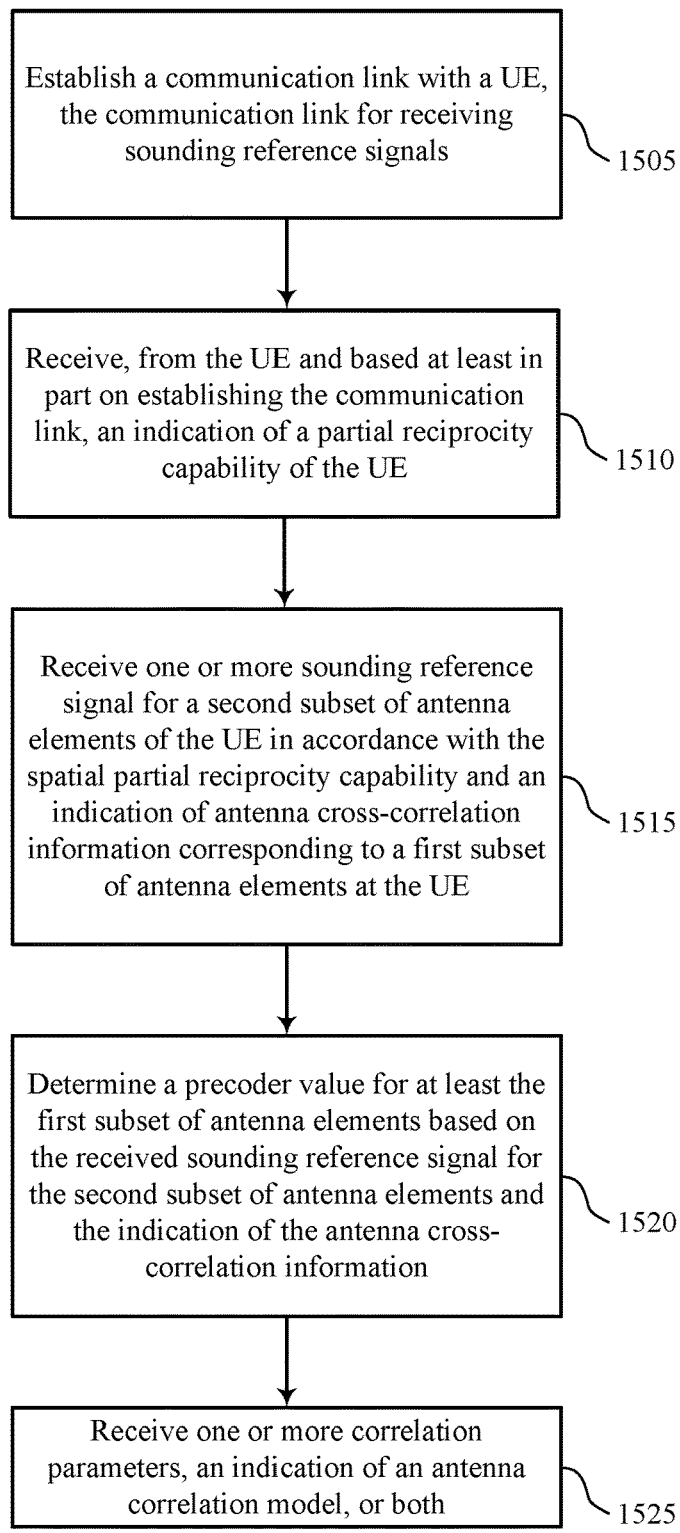

FIG. 15 shows a flowchart illustrating a method 1500 that supports antenna correlation feedback for partial reciprocity situations in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may establish a communication link with a UE, the communication link for receiving sounding reference signals. The operations of 1505 may be performed according to the methods described herein. In some examples, aspects of the operations of 1505 may be performed by a communication link component as described with reference to FIGS. 8 through 11.

At 1510, the base station may receive, from the UE and based at least in part on establishing the communication link, an indication of a partial reciprocity capability of the UE. The operations of 1510 may be performed according to the methods described herein. In some examples, aspects of the operations of 1510 may be performed by a capability component as described with reference to FIGS. 8 through 11.

At 1515, the base station may receive one or more sounding reference signal for a second subset of antenna elements of the UE in accordance with the spatial partial reciprocity capability and an indication of antenna cross-correlation information corresponding to a first subset of antenna elements at the UE. The operations of 1515 may be performed according to the methods described herein. In some examples, aspects of the operations of 1515 may be performed by a communication component as described with reference to FIGS. 8 through 11.

At 1520, the base station may determine a precoder value for at least the first subset of antenna elements based on the received sounding reference signal for the second subset of antenna elements and the indication of the antenna cross-correlation information. The operations of 1520 may be performed according to the methods described herein. In some examples, aspects of the operations of 1520 may be performed by a precoder component as described with reference to FIGS. 8 through 11.

At 1525, the base station may receive one or more correlation parameters, an indication of an antenna correlation model, or both. The operations of 1525 may be performed according to the methods described herein. In some examples, aspects of the operations of 1525 may be performed by a cross-correlation component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    establishing a communication link with a base station, wherein the UE is configured to transmit sounding reference signals for the communication link;
    transmitting, to the base station, an indication of a partial reciprocity capability of the UE based at least in part on establishing the communication link;
    determining antenna cross-correlation information for a first subset of antenna elements of the UE; and
    transmitting, to the base station, a sounding reference signal for a second subset of the antenna elements of the UE in accordance with the spatial partial reciprocity capability and an indication of the antenna cross-correlation information for the first subset of antenna elements of the UE, the indication of the antenna cross-correlation information transmitted on a per band or per band combination basis and including one or more correlation parameters, an antenna correlation model, or both.

2. The method of claim 1, further comprising:
    determining an average cross-correlation of at least some of the first subset of antenna elements in accordance with the antenna correlation model, wherein transmitting the one or more correlation parameters comprises transmitting the average cross-correlation of the first subset of antenna elements.

3. The method of claim 1, wherein transmitting the one or more correlation parameters comprises:
    transmitting the one or more correlation parameters comprising a distance between two antenna elements, a reference correlation value, a scaling factor indicating correlation values for at least some of the first subset of antenna elements relative to a correlation value of one or more of the second subset of antenna elements, or any combination thereof.

4. The method of claim 1, further comprising:
    determining at least one cross-correlation value corresponding to at least one cross-correlation of at least two antenna elements of the first subset of antenna elements in accordance with the antenna correlation model, wherein transmitting the one or more correlation parameters comprises transmitting the at least one cross-correlation value.

5. The method of claim 1, wherein transmitting the antenna cross-correlation information further comprises:
    transmitting channel state information to the base station, wherein the channel state information comprises an indication of an antenna correlation value of unsounded sounding reference signal ports comprising the second subset of antenna elements, an indication of the antenna correlation model, or both.

6. The method of claim 5, further comprising:
    receiving, from the base station, a request for the channel state information, wherein the channel state information is transmitted based at least in part on the received request.

7. The method of claim 6, wherein the request for the channel state information is received using radio resource control signaling, medium access control element signaling, or both.

8. The method of claim 5, wherein the channel state information is transmitted to the base station on a semi-static basis or a dynamic basis.

9. The method of claim 5, wherein transmitting the channel state information comprises:
    transmitting the channel state information on a physical uplink control channel or a physical uplink shared channel.

10. The method of claim 9, further comprising:
    determining to transmit the channel state information on the physical uplink control channel or the physical uplink shared channel based at least in part on a size of the channel state information.

11. The method of claim 1, wherein transmitting the one or more correlation parameters comprises:
transmitting the one or more correlation parameters corresponding to a spatial correlation matrix, an antenna imbalance, or both.

12. The method of claim 1, wherein the antenna correlation model is based at least in part on an antenna spatial separation between at least two antennas of the antenna elements and a reference correlation value indicating an envelope correlation between two cross-polarized antenna elements.

13. The method of claim 1, wherein the antenna correlation model is based at least in part on an antenna spatial separation between at least two antennas of the antenna elements, a reference correlation value indicating an envelope correlation between two cross-polarized antenna elements, and a number of antennas.

14. The method of claim 1, wherein the antenna correlation model is based at least in part on a first reference correlation value of cross-polarized antenna elements in a first dimension, a second reference correlation value of cross-polarized antenna elements in a second dimension, a correlation value of cross-polarized antenna elements having different polarizations, or a combination thereof.

15. The method of claim 1, wherein the first subset of antenna elements includes at least each antenna element of the second subset of the antenna elements.

16. The method of claim 1, wherein the first subset of antenna elements is different from the second subset of antenna elements.

17. The method of claim 1, further comprising:
transmitting, to the base station, a capability indicator specifying a first number of sounding reference signal ports that the UE is capable of sounding during a sounding period; and
receiving, from the base station, a request to sound a second number of sounding reference signal ports different than the first number of sounding reference signal ports during the sounding period in accordance with the spatial partial reciprocity capability, wherein the sounding reference signal for the second subset of antenna elements is transmitted in accordance with the request.

18. The method of claim 1, further comprising:
receiving, from the base station, a downlink communication having a precoding determined in accordance with the sounding reference signal and the antenna cross-correlation information.

19. The method of claim 1, wherein the sounding reference signal and the antenna cross-correlation information indicate a precoder value for receiving downlink communications on each receive antenna of the UE.

20. The method of claim 1, wherein the antenna cross-correlation information indicates an envelope correlation between cross-polarized antenna elements.

21. The method of claim 1, wherein the antenna elements comprise physical antennas, sounding reference signal ports, or both.

22. An apparatus for wireless communications at a user equipment (UE), comprising:
a processor,
memory coupled with the processor; and
instructions stored in the memory and executable by the processor to cause the apparatus to:
establish a communication link with a base station, wherein the UE is configured to transmit sounding reference signals for the communication link in accordance with a spatial partial reciprocity capability;
determine antenna cross-correlation information for a first subset of antenna elements of the UE; and
transmit, to the base station, a sounding reference signal for a second subset of the antenna elements of the UE in accordance with the spatial partial reciprocity capability and an indication of the antenna cross-correlation information for the first subset of antenna elements of the UE, the indication of the antenna cross-correlation information transmitted on a per band or per band combination basis and including one or more correlation parameters, an antenna correlation model, or both.

23. The apparatus of claim 22, wherein the instructions to transmit the one or more correlation parameters are executable by the processor to cause the apparatus to:
transmit the one or more correlation parameters comprising a distance between two antenna elements, a reference correlation value, a scaling factor indicating correlation values for at least some of the first subset of antenna elements relative to a correlation value of one or more of the second subset of antenna elements, or any combination thereof.

24. The apparatus of claim 22, wherein the instructions are further executable by the processor to cause the apparatus to:
determine at least one cross-correlation value corresponding to at least one cross-correlation of at least two antenna elements of the first subset of antenna elements in accordance with the antenna correlation model, wherein the instructions to transmit the one or more correlation parameters are further executable by the processor to cause the apparatus to transmit the at least one cross-correlation value.

25. An apparatus for wireless communications at a user equipment (UE), comprising:
means for establishing a communication link with a base station, wherein the UE is configured to transmit sounding reference signals for the communication link in accordance with a spatial partial reciprocity capability;
means for determining antenna cross-correlation information for a first subset of antenna elements of the UE; and
means for transmitting, to the base station, a sounding reference signal for a second subset of the antenna elements of the UE in accordance with the spatial partial reciprocity capability and an indication of the antenna cross-correlation information for the first subset of antenna elements of the UE, the indication of the antenna cross-correlation information transmitted on a per band or per band combination basis and including one or more correlation parameters, an antenna correlation model, or both.

26. A non-transitory computer-readable medium storing code for wireless communications at a user equipment (UE), the code comprising instructions executable by a processor to:
establish a communication link with a base station, wherein the UE is configured to transmit sounding reference signals for the communication link in accordance with a spatial partial reciprocity capability;

determine antenna cross-correlation information for a first subset of antenna elements of the UE; and transmit, to the base station, a sounding reference signal for a second subset of the antenna elements of the UE in accordance with the spatial partial reciprocity capability and an indication of the antenna cross-correlation information for the first subset of antenna elements of the UE, the indication of the antenna cross-correlation information transmitted on a per band or per band combination basis and including one or more correlation parameters, an antenna correlation model, or both.

* * * * *